United States Patent
Sekizawa

(10) Patent No.: US 11,872,856 B2
(45) Date of Patent: Jan. 16, 2024

(54) WHEEL POSITION DETECTION APPARATUS AND TIRE PNEUMATIC PRESSURE MONITORING SYSTEM INCLUDING SAME

(71) Applicant: DENSO CORPORATION, Kariya (JP)

(72) Inventor: Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 570 days.

(21) Appl. No.: 17/140,659

(22) Filed: Jan. 4, 2021

(65) Prior Publication Data
US 2021/0122197 A1 Apr. 29, 2021

Related U.S. Application Data

(63) Continuation of application No. PCT/JP2019/027373, filed on Jul. 10, 2019.

(30) Foreign Application Priority Data

Jul. 11, 2018 (JP) .................. 2018-131629

(51) Int. Cl.
*B60C 19/00* (2006.01)
*B60C 23/04* (2006.01)
(Continued)

(52) U.S. Cl.
CPC .......... *B60C 23/0488* (2013.01); *G01L 17/00* (2013.01); *G01P 3/481* (2013.01); *G01P 15/00* (2013.01); *G07C 5/02* (2013.01)

(58) Field of Classification Search
CPC ............ B60C 23/0488; B60C 23/0416; B60C 23/0489; B60C 19/00; G07C 5/02;
(Continued)

(56) References Cited

U.S. PATENT DOCUMENTS

2014/0379291 A1 12/2014 Mori et al.
2017/0219383 A1* 8/2017 Umehara .................. G01P 3/44
(Continued)

FOREIGN PATENT DOCUMENTS

| JP | H1048233 A | 2/1998 |
| JP | 2013133058 A | 7/2013 |
| JP | 2018016300 A | 2/2018 |

*Primary Examiner* — Abby Y Lin
*Assistant Examiner* — Hossam M Abd El Latif
(74) *Attorney, Agent, or Firm* — Harness, Dickey & Pierce, P.L.C.

(57) ABSTRACT

A wheel position detection apparatus applied to a vehicle including a vehicle body attached with multiple travelling wheels. The apparatus includes: multiple transmitters respectively disposed at travelling wheels; and a receiver disposed at the vehicle body. The transmitter includes: an acceleration sensor outputting a detection signal according to an acceleration including a gravitational acceleration component being varied by a rotation of the corresponding travelling wheel attached with the transmitter; and a first controller creating a frame including unique identification information, and transmit the frame in response to the receiver outputting a transmission command. The receiver includes a second controller executing a wheel position detection through: identifying, from each set of the unique identification information included in the frame, which of the travelling wheels is attached with the transmitter having transmitted the frame; and registering the travelling wheels in association with the unique identification information of the transmitter.

7 Claims, 10 Drawing Sheets

(51) Int. Cl.
  *G01L 17/00*   (2006.01)
  *G01P 3/481*   (2006.01)
  *G01P 7/00*    (2006.01)
  *G01P 15/00*   (2006.01)
  *G07C 5/02*    (2006.01)
  *G07C 5/08*    (2006.01)

(58) Field of Classification Search
  CPC ....... G07C 5/0808; G01L 17/00; G01P 3/481; G01P 15/00; G01P 7/00
  USPC .......................................................... 701/33
  See application file for complete search history.

(56) References Cited

U.S. PATENT DOCUMENTS

| | | | |
|---|---|---|---|
| 2017/0259627 A1* | 9/2017 | Araya ................. | B60C 23/0488 |
| 2018/0023977 A1* | 1/2018 | Park .................... | B60C 23/0416 |
| | | | 324/207.2 |
| 2018/0162183 A1* | 6/2018 | Park .................... | B60C 23/0461 |
| 2019/0279497 A1 | 9/2019 | Sekizawa et al. | |

* cited by examiner

FIRST RECEPTION

SECOND RECEPTION

THIRD RECEPTION

| RECEPTION | TIME (t) | GEAR POSITION AT TIME OF RECEPTION (0 TO 95) | | | | LOGIC FOR GEAR POSITION IDENTIFICATION (TRUE or FALSE) | | | |
|---|---|---|---|---|---|---|---|---|---|
| | | FL | FR | RL | RR | FL | FR | RL | RR |
| RECEPTION 1 | 0.0 | 68 | 92 | 62 | 78 | — | — | — | — |
| RECEPTION 2 | 5.1 | 56 | 42 | 38 | 8 | TRUE | FALSE | TRUE | FALSE |
| RECEPTION 3 | 10.3 | 72 | 26 | 42 | 72 | TRUE | / | TRUE | / |
| RECEPTION 4 | 14.3 | 60 | 62 | 22 | 6 | TRUE | / | FALSE | / |

| RECEPTION | TIME (t) | GEAR POSITION AT TIME OF RECEPTION (0 TO 95) | | | | LOGIC FOR GEAR POSITION IDENTIFICATION (TRUE or FALSE) | | | |
|---|---|---|---|---|---|---|---|---|---|
| | | FL | FR | RL | RR | FL | FR | RL | RR |
| RECEPTION 1 | 0.0 | 38 | 68 | 30 | 50 | — | — | — | — |
| RECEPTION 2 | 4.1 | 2 | 78 | 80 | 46 | FALSE | TRUE | FALSE | TRUE |
| RECEPTION 3 | 8.3 | 42 | 74 | 14 | 28 | / | TRUE | / | TRUE |
| RECEPTION 4 | 12.4 | 88 | 78 | 52 | 22 | / | TRUE | / | FALSE |

| RECEPTION | TIME (t) | GEAR POSITION AT TIME OF RECEPTION (0 TO 95) | | | | LOGIC FOR GEAR POSITION IDENTIFICATION (TRUE or FALSE) | | | |
|---|---|---|---|---|---|---|---|---|---|
| | | FL | FR | RL | RR | FL | FR | RL | RR |
| RECEPTION 1 | 0.0 | 62 | 94 | 54 | 76 | — | — | — | — |
| RECEPTION 2 | 4.5 | 80 | 66 | 60 | 32 | TRUE | FALSE | TRUE | FALSE |
| RECEPTION 3 | 9.0 | 92 | 40 | 64 | 88 | FALSE | / | TRUE | / |

| RECEPTION | TIME (t) | GEAR POSITION AT TIME OF RECEPTION (0 TO 95) | | | | LOGIC FOR GEAR POSITION IDENTIFICATION (TRUE or FALSE) | | | |
|---|---|---|---|---|---|---|---|---|---|
| | | FL | FR | RL | RR | FL | FR | RL | RR |
| RECEPTION 1 | 0.0 | 36 | 86 | 24 | 62 | — | — | — | — |
| RECEPTION 2 | 4.5 | 0 | 6 | 74 | 64 | FALSE | TRUE | FALSE | TRUE |
| RECEPTION 3 | 8.6 | 62 | 24 | 30 | 70 | / | FALSE | / | TRUE |

WHEEL POSITION DETECTION APPARATUS AND TIRE PNEUMATIC PRESSURE MONITORING SYSTEM INCLUDING SAME

CROSS REFERENCE TO RELATED APPLICATIONS

The present application is a continuation application of International Patent Application No. PCT/JP2019/027373 filed on Jul. 10, 2019, which designated the U.S. and claims the benefit of priority from Japanese Patent Application No. 2018-131629 filed on Jul. 11, 2018. The entire disclosures of all of the above applications are incorporated herein by reference.

TECHNICAL FIELD

The present disclosure relates to a wheel position detection apparatus and a tire pneumatic pressure monitoring system including the wheel position detection apparatus.

BACKGROUND

A tire pneumatic pressure monitoring system (TPMS) may be a direct type for directly detecting a tire's pneumatic pressure. The direct type of TPMS includes a transmitter equipped with a sensor such as a pressure sensor. The sensor transmitter is directly attached to each wheel that is joined with a tire.

SUMMARY

The present disclosure describes a wheel position detection apparatus for automatically detecting a target wheel at a vehicle and a tire pneumatic pressure monitoring system (hereinafter referred to as TPMS) including the wheel position detection apparatus.

BRIEF DESCRIPTION OF DRAWINGS

Other objects, features and advantages of the present disclosure will become more apparent from the following detailed description made with reference to the accompanying drawings. In the drawings:

FIG. 6A is a chart showing evaluation results of the wheel position;

FIG. 6B is a chart showing evaluation results of the wheel position;

FIG. 6C is a chart showing evaluation results of the wheel position;

FIG. 6D is a chart showing evaluation results of the wheel position;

DETAILED DESCRIPTION

Figure 1:
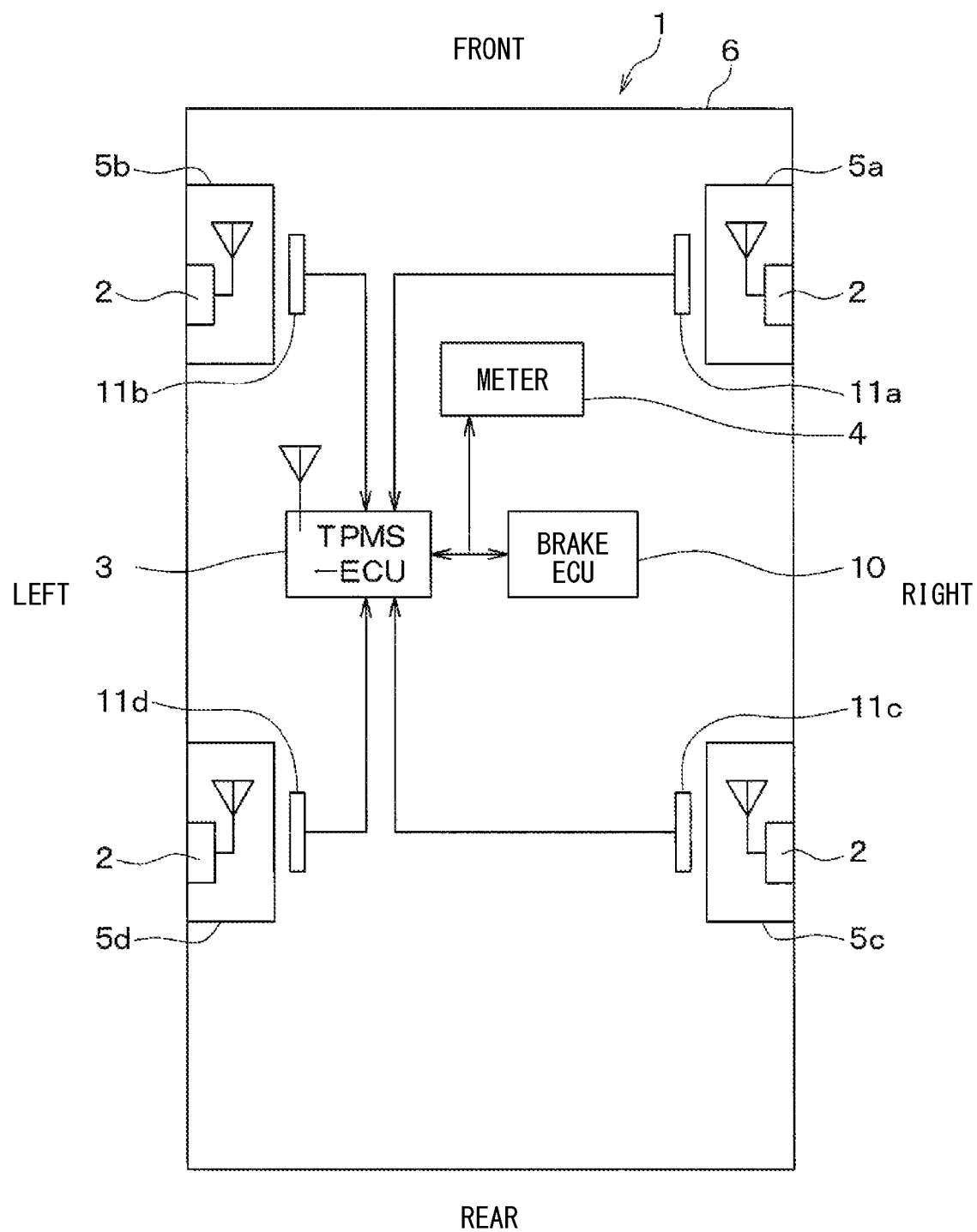
FIG. 1 is a block diagram showing an overall configuration of a TPMS to which a wheel position detection apparatus according to a first embodiment is applied.

In a direct-type TPMS, a detection signal from the sensor is transmitted by the transmitter and received by the receiver via an antenna to detect the tire's pneumatic pressure. The tire's pneumatic pressure may also be referred to as a tire's air pressure.

In such a direct-type TPMS, it may be required to determine whether or not the transmitted data belongs to the own vehicle and which wheel the transmitter is attached to. Thus, identification information (hereinafter referred to as ID information) for determining whether or not the vehicle is the subject vehicle and determining the wheel at which the transmitter is attached. Subsequently, wheel position detection is executed for identifying the attachment location of the transmitter on each wheel. In other words, the wheel position detection is executed for identifying which of wheels of the vehicle is attached by the transmitter. The ID information of each transmitter and the attachment location of each transmitter to each wheel are associated with each other and stored.

However, the timing for data transmission from the transmitter at the wheel is, for example, 300 MHz or 400 MHz in unidirectional transmission, and the transmission timing may not be controlled. Therefore, the data transmission is not executed at a timing suitable for the wheel position detection. Therefore, it may take a longer time in the wheel position detection.

According to the first aspect of the present disclosure, a wheel position detection apparatus is to be applied to a vehicle including a vehicle body attached with multiple travelling wheels. Each of the travelling wheels having a tire. The wheel position detection apparatus includes multiple transmitters and a receiver. Each of the transmitters is attached to a corresponding traveling wheel in the travelling wheels. The receiver is disposed at the vehicle body. Each of the transmitters includes an acceleration sensor and a first controller. The acceleration sensor outputs a detection signal according to an acceleration including a gravitational acceleration component being varied by a rotation of the corresponding travelling wheel attached with the each of the transmitters. The first controller creates a frame including unique identification information, and transmits the frame in response to the receiver outputting a transmission command. The receiver includes a second controller to execute a wheel position detection, in response to receiving the frame transmitted from the each of the transmitters, through: identifying, from each set of the unique identification information included in the frame, the corresponding travelling wheel attached with the each of the transmitters having transmitted the frame; and registering the travelling wheels in association with the unique identification information of the each of the transmitters attached to the corresponding travelling wheel in the travelling wheels. The second controller further acquires an edge number of a gear or a tooth number of the gear based on a detection signal of a wheel velocity sensor for detecting a passage of teeth of the gear rotating in coordination with the corresponding travelling wheel. The gear has a circumferential surface with tooth portions and a portion between the tooth portions to alternatively exhibit different magnetoresistance values, and the tooth portions are conductors. The second controller further detects suitable timing based on difference in the edge number among the travelling wheels or difference in the tooth number among the travelling wheels, and outputs the transmission command to the each of the transmitters attached to the corresponding travelling wheel, in response to detecting the suitable timing. In a situation where an arbitrary circumferential position of the corresponding travelling wheel centered with respect to a central axis of the corresponding travelling wheel attached with the each of the transmitters having the first controller forms an angle of zero degrees, the first controller detects a presence angle being an angle where the each of the transmitters is present with respect to the arbitrary circumferential position, based on the gravitational acceleration component included in the detection signal of the acceleration sensor, and transmits the frame at a timing in which the presence angle reaches a predetermined angle, in response to the second controller outputting the transmission command. The second controller further sets a variation tolerance width based on the edge number or the tooth number at a timing of receiving the frame, remove at least one of the travelling wheels from candidate wheels each of which is attached with the each of the transmitters having transmitted the frame, in a condition that the edge number corresponding to the at least one of the travelling wheels or the tooth number corresponding to the at least one of the travelling wheels is outside of a range of the variation tolerance width at the timing of receiving the frame subsequent to setting the variation tolerance width, and register remainder of the candidate wheels as the corresponding travelling wheel with which the each of the transmitters has transmitted the frame.

According to the second aspect of the present disclosure, a wheel position detection apparatus is to be applied to a vehicle including a vehicle body attached with multiple travelling wheels. Each of the travelling wheels having a tire. The wheel position detection apparatus includes multiple transmitters and a receiver. Each of the transmitters is attached to a corresponding traveling wheel in the travelling wheels. The receiver is disposed at the vehicle body. Each of the transmitters includes an acceleration sensor and a first controller. The acceleration sensor outputs a detection signal according to an acceleration including a gravitational acceleration component being varied by a rotation of the corresponding travelling wheel attached with the each of the transmitters. The first controller creates a frame including unique identification information, and transmits the frame in response to the receiver outputting a transmission command. The receiver includes a second controller to execute a wheel position detection, in response to receiving the frame transmitted from the each of the transmitters, through: identifying, from each set of the unique identification information included in the frame, the corresponding travelling wheel attached with the each of the transmitters having transmitted the frame; and registering the travelling wheels in association with the unique identification information of the each of the transmitters attached to the corresponding travelling wheel in the travelling wheels. The second controller further acquires an edge number of a gear or a tooth number of the gear based on a detection signal of a wheel velocity sensor for detecting a passage of teeth of the gear rotating in coordination with the corresponding travelling wheel. The gear has a circumferential surface with tooth portions and a portion between the tooth portions to alternatively exhibit different magnetoresistance values, and the tooth portions are conductors. The second controller further detects suitable timing based on difference in the edge number among the travelling wheels or difference in the tooth number among the travelling wheels, sets a reference value for the edge number or the tooth number with respect to each of the travelling wheels, and outputs the transmission command to the each of the transmitters attached to the corresponding wheel, at a timing in which the edge number or the tooth number reaches the reference value. In a situation where an arbitrary circumferential position of the corresponding travelling wheel centered with respect to a central axis of the corresponding travelling wheel attached with the each of the transmitters having the first controller forms an angle of zero degrees, the first controller detects a presence angle being an angle where the each of the transmitters is present with respect to the arbitrary circumferential position, based on the gravitational acceleration component included in the detection signal of the acceleration senor, and transmits the frame including information of the presence angle at a timing of receiving the transmission command. The second controller further sets a variation tolerance width based on the edge number or the tooth number at a timing of receiving the frame, remove at least one of the travelling wheels from candidate wheels each of which is attached with the each of the transmitters having transmitted the frame, in a condition that the edge number corresponding to the at least one of the travelling wheels or the tooth number corresponding to the at least one of the travelling wheels is outside of a range of the variation tolerance width at the timing of receiving the frame subsequent to setting the variation tolerance width, and register remainder of the candidate wheels as the corresponding travelling wheel with which the each of the transmitters has transmitted the frame.

According to the above mentioned first and second aspects of the present disclosure, the suitable timing for executing the frame transmission for detecting wheel position is detected, and the transmission command is output for instructing the frame transmission to each transmitter through the receiver at the suitable timing. The receiver receives the response frame transmitted from the transmitter in response to the transmission command, and executes the wheel position detection based on the gear information of each of the travelling wheels at the reception timing. Therefore, it is possible to provide a wheel position detection apparatus for detecting the wheel position in a shorter time.

The following describes embodiments of the present disclosure with reference to the drawings. In the following embodiments, the same or equivalent parts are denoted by the same reference numerals for description.

First Embodiment

Hereinafter, a first embodiment of the present disclosure will be described with reference to the drawings. The following describes an entire configuration of TPMS applied with a wheel position detection apparatus according to the first embodiment of the present disclosure. An up-and-down direction of the page in FIG. 1 corresponds to a front direction of a vehicle 1; a right-and-left direction of the page corresponds to a left-and-right direction of the vehicle 1.

As shown in FIG. 1, the TPMS is attached to the vehicle 1, and includes a transmitter 2, an ECU for TPMS (hereinafter referred to as TPMS-ECU) 3, and a meter 4. The TPMS-ECU 3 is included in a receiver. The wheel position detection apparatus adopts the transmitter 2 and the TPMS-ECU 3 included in the TPMS. The wheel position detection apparatus acquires gear information based on the detected signals of wheel velocity sensors 11a to 11d included in corresponding wheels 5a to 5d from a brake control ECU (hereinafter referred to as a brake ECU) to identify the wheel position.

As illustrated in FIG. 1, the transmitter 2 detects the pneumatic pressure of the tire attached to each of the traveling wheels 5a to 5d, and stores and transmits information on the tire's pneumatic pressure indicating the detection result into the frame together. On the other hand, the TPMS-ECU 3 is attached to the vehicle body 6 side of the vehicle 1, receives the frame transmitted from the transmitter 2, and performs various kinds of processing and calculations on the basis of the detection signal stored the frame, to perform the wheel position detection and the tire's pneumatic pressure detection. For example, the transmitter 2 creates a frame by frequency shift keying (FSK), and the TPMS-ECU 3 demodulates the frame to read the data in the frame and performs the wheel position detection and the tire's pneumatic pressure detection. The following describes the detailed configurations of the transmitter 2 and the TPMS-ECU 3 with reference to FIGS. 2A and 2B.

Figure 2A:
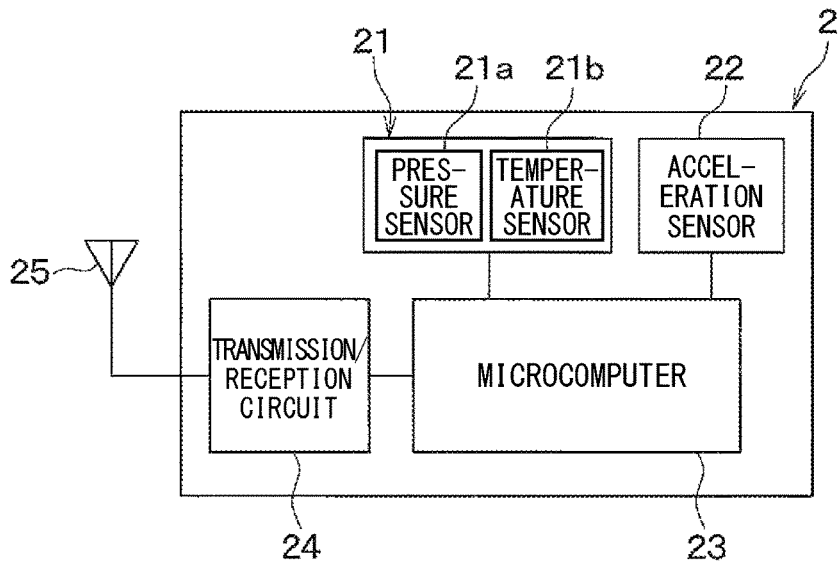
FIG. 2A is a block diagram showing a detail of a transmitter.

As shown in FIG. 2A, the transmitter 2 includes a sensing part 21, an acceleration sensor 22, a microcomputer 23, a transmission/reception (transceiver) circuit 24, and an antenna 25. Each part of the transmitter 2 is driven based on the power supply from a battery (not shown), and bidirectional communication can be executed with the TPMS-ECU 3.

The sensing part 21 is configured to include a pressure sensor 21a and a temperature sensor 21b, for example, and outputs a detection signal in accordance with tire's pneumatic pressure and a detection signal in accordance with a temperature inside a tire. The acceleration sensor 22 is used to detect the position of the sensor itself on each of the traveling wheels 5a to 5d to which the transmitter 2 is attached, that is, to detect the position of the transmitter 2 and the vehicle speed. The acceleration sensor 22 of the present embodiment outputs a detection signal corresponding to the acceleration in the radial direction of each of the traveling wheels 5a to 5d, that is both directions vertical to the circumferential direction, among the accelerations that act on the traveling wheels 5a to 5d during the rotation of the traveling wheels 5a to 5d, for example.

The microcomputer 23 corresponds to the first controller and is a computer including a computer processing unit (CPU), a read-only memory (ROM), a random-access memory (RAM), input/output (I/O), and the like. The microcomputer 23 executes predetermined processing in accordance with a program stored in a memory corresponding to a non-transition substantive recording medium such as a ROM. The memory in the microcomputer 23 stores individual ID information including ID information unique to the transmitter for identifying each transmitter 2 and ID information unique to the vehicle for identifying the subject vehicle.

The microcomputer 23 receives the detection signal concerning the tire's pneumatic pressure from the sensing part 21, performs signal processing on the received signal while processing the signal as necessary, and stores the information on the tire's pneumatic pressure into the frame together with the ID information of each transmitter 2. After creating the frame, the microcomputer 23 performs the processing of transmitting a frame from the transmission antenna 25 to the TPMS-ECU 3 via the transmission/reception circuit 24, that is, performing data transmission.

The transmitter 2 executes different frame transmission processing in a registration mode and in a periodic transmission mode. In the registration mode, the wheel position is detected and then ID information is registered. In the periodic transmission mode, the tire's pneumatic pressure is detected. In the present embodiment, when a start switch (not shown) is pressed down, the TPMS-ECU 3 is turned to the registration mode, and a registration mode signal indicating the registration mode is transmitted. Then, each transmitter is turned to the registration mode based on this situation. Alternatively, each transmitter 2 is automatically turned to the registration mode when the transmitter 2 detects the start of vehicle travelling. For example, the microcomputer 23 detects the vehicle speed by monitoring the detection signal of the acceleration sensor 22. Based on this situation, the microcomputer 23 detects the start of vehicle travelling at the occurrence of vehicle speed and is turned to the registration mode, after the detected vehicle speed turns to zero and the vehicle stop is detected or after the situation of the vehicle stop time exceeding a predetermined time is detected. The frame transmission for registration mode is executed based on a transmission command from the TPMS-ECU 3 as described in the following. Since the registration of the ID information is completed and then the notification indicating the completion of the registration is transmitted from the TPMS-ECU 3, the transmitter 2 receives the notification and is turned to the periodic transmission mode to execute frame transmission for detecting the tire's pneumatic pressure.

In the registration mode, for example, the microcomputer 23 executes an initial frame transmission, and then executes a response frame transmission each time the transmission command of the frame transmission requested by the TPMS-ECU 3 arrives. The timing of outputting the transmission command is set on the TPMS-ECU 3 side to be a timing particularly effective for detecting the wheel position, as will be described in the following.

The microcomputer 23 also detects the position of the transmitter 2 on each of the traveling wheels 5a to 5d to which each transmitter 2 is attached by monitoring the detection signal of the acceleration sensor 22. The position detection means angle detection for detecting, in each of the traveling wheels 5a to 5d, an angle at which the acceleration sensor 22 exists around the central axis of each of the traveling wheels 5a to 5d, in other words, an angle at which the transmitter 2 is present (hereinafter referred to as a presence angle). In the registration mode, the microcomputer 23 executes frame transmission at a timing in which the presence angle of the transmitter 2 reaches a predetermined angle based on a detected signal of the acceleration sensor 22, in a situation of having initial frame transmission and response frame transmission.

For example, the microcomputer 23 determines that the vehicle 1 is traveling when the vehicle speed reaches a predetermined speed, for example, 5 km/h or more. The output of the acceleration sensor 22 includes acceleration based on centrifugal force (hereinafter referred to as centrifugal acceleration). The vehicle speed can be calculated by integrating the centrifugal acceleration and multiplying the integrated value by a coefficient. For this reason, the microcomputer 23 calculates the centrifugal acceleration by removing a gravitational acceleration component from the output of the acceleration sensor 22, and calculates the vehicle speed on the basis of the centrifugal acceleration.

In addition, since the detection signal of the acceleration sensor 22 is a signal corresponding to the rotation of each of the traveling wheels 5a to 5d, during the traveling, the detection signal becomes a signal including a gravitational acceleration component and having an amplitude corresponding to the wheel rotation. For example, the amplitude of the detection signal is a negative maximum amplitude when the transmitter 2 is located at the upper position around the central axis of the traveling wheels 5a to 5d. The amplitude of the detection signal is zero when the transmitter 2 is located at the horizontal position. The amplitude of the detection signal is a positive maximum amplitude when the transmitter 2 is located at the lower position. Based on this amplitude, the presence angle of the transmitter 2 can be detected, and for example, it is possible to know as the presence angle being an angle formed by the transmitter 22, which is set to 0° when the transmitter 22 is located at the upper position around the central axis of each of the traveling wheels 5a to 5d.

The microcomputer 23 is switched to the registration mode, and executes the initial frame transmission as a transmission timing in which the presence angle of the transmitter reaches the predetermined angle when the transmission command of the initial frame arrives. The predetermined angle is determined in advance. However, the predetermined angle may be an angle at a timing of receiving the transmission command or at a timing in which the vehicle speed reaches the predetermined speed. To detect the start of travelling from the detected signal of the acceleration sensor 22, the undulation of the detected signal gets larger and it may be preferable that the vehicle speed reaches a certain level such as 5 km/h or more. Therefore, after the vehicle speed reaches the predetermined speed or more, the frame transmission may be executed when the presence angle reaches the predetermined angle. Herein, the initial frame transmission is executed subsequent to the arrival of the transmission command. However, the initial frame transmission may be executed as the presence angle of the transmitter 2 reaches the predetermined angle after the microcomputer 23 is switched into the registration mode, without executing an instruction to the transmission command.

Subsequently, as the transmission command of the frame transmission arrives, the response frame transmission from the transmitter 2 is executed as the transmission timing in which the forming angle of the acceleration sensor 22 reaches an angle identical to the one at the first frame transmission.

Subsequent to the start of travelling of the vehicle 1, when the ID registration is completed and the completion notification is transmitted from the TPMS-ECU 3, the transmitter 2 is switched to the periodic transmission mode, and executes the frame transmission in each predetermined periodic transmission cycle. For example, when the mode is switched to the periodic transmission mode, the frame transmission is performed in each relatively long periodic transmission cycle, for example, every one minute, whereby a signal concerning the tire's pneumatic pressure is periodically transmitted to the TPMS-ECU 3 side. At this time, for example, by providing a random delay for each transmitter 2, it is possible to shift the transmission timing of each transmitter 2, and to prevent the TPMS-ECU 3 side from being unable to receive frames due to radio wave interference from multiple transmitters 2.

The frame transmission in the periodic transmission mode may be set at a timing in which the presence angle of the transmitter 2 reaches the predetermined angle. However, it may not be particularly limited to this situation. The frame transmission in the periodic transmission mode may be set at an arbitrary presence angle. For example, when the mode is switched to the periodic transmission mode, the frame transmission is performed in each relatively long periodic cycle in view of battery life, for example, every one minute, whereby a signal concerning the tire's pneumatic pressure is periodically transmitted to the TPMS-ECU 3 side.

The transmission/reception circuit 24 functions as an output device and an input device. The output device transmits the frame sent from the microcomputer 23 to the TPMS-ECU 3 through the antenna 25. The input device receives the signal indicative of, for example, a command sent from the TPMS-ECU 3. For the frame transmission or the transmission of an instruction signal from the TPMS-ECU 3, for example, radio waves in the radio frequency (RF) band are used. The transmission/reception circuit 24 and the antenna 25 may be respectively configured as one device for each of the transmission/reception circuit 24 and the antenna 25. However, separated configurations may also be provided for transmission and reception.

The transmitter 2 configured as described above is attached to, for example, an air injection valve in each of the traveling wheels 5a to 5d and is disposed so that the sensing part 21 is exposed inside the tire. Then, the transmitter 2 detects the tire's pneumatic pressure of each of the traveling wheels 5a to 5d to which the transmitter 2 is attached. In the ID registration mode, the initial frame transmission or the response frame is performed in the transmission cycle through the transmission antenna 25 provided in each transmitter 2. Thereafter, when the mode is switched to the periodic transmission mode after the completion of registration mode, the frame transmission is repeatedly performed in each transmission cycle.

Figure 2B:
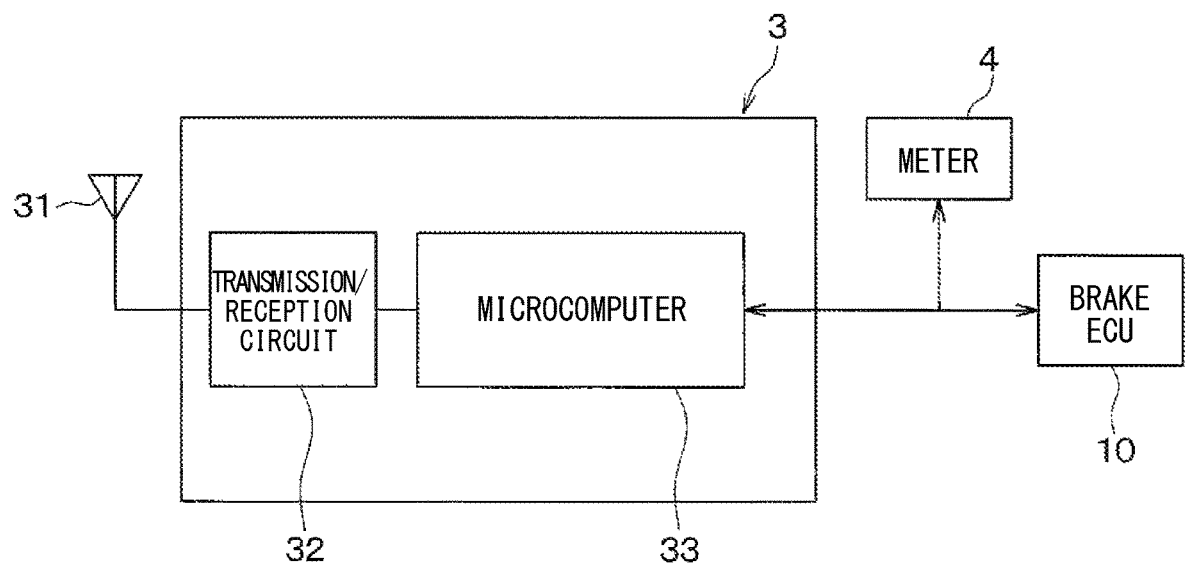
FIG. 2B is a block diagram showing a detail of a receiver.

Further, as shown in FIG. 2B, the TPMS-ECU 3 includes, for example, an antenna 31, a transmission/reception (transceiver) circuit 32, and a microcomputer 33. The TPMS-ECU 3 corresponds to a receiver. The TPMS-ECU 3 receives a frame transmitted from each transmitter 2 to execute the ID registration of each transmitter 2 of the subject vehicle to detect tire's pneumatic pressure.

The antenna 31 receives the frame sent from each transmitter 2, and transmits the transmission command for instructing the transmitter 2 in the registration mode to transmit a frame. The antenna 31 is fixed to the vehicle body 6 and may be an internal antenna disposed in the main body of the TPMS-ECU 3, or may be an external antenna in which wiring is extended from the main body.

The transmission/reception circuit 32 functions as an input device that receives a transmission frame from each transmitter 2 received by the reception antenna 31 and transmits the frame to the microcomputer 33, and functions as an output device to transmit, for example, the transmission command. When receiving the frame through the reception antenna 31, the reception circuit 32 transmits the received signal to the microcomputer 33. The transmission/reception circuit 32 transmits the transmission command through the antenna 31 as the transmission command is sent from the microcomputer 33. The antenna 31 and the transmission/reception circuit 32 may be respectively configured as one device for each of the antenna 31 the transmission/reception circuit 32. However, separated configurations may also be provided for transmission and reception.

The microcomputer 33 corresponds to the second controller. The microcomputer 33 is a computer including a CPU, a ROM, a RAM, an I/O, and the like and executes the wheel position detection or the tire's pneumatic pressure detection in accordance with a program stored in a memory corresponding to a non-transition substantive recording medium such as a ROM.

In the present embodiment, when the vehicle starts travelling or a user operates an operation switch, the microcomputer 33 executes ID registration by executing the wheel position detection according to a program stored in a memory.

In particular, the microcomputer 33 acquires gear information from the brake ECU 10 through an in-vehicle LAN such as CAN. Then, the microcomputer 33 identifies the wheel position on the basis of the relationship between the gear information acquired from the brake ECU 10 and the reception timing at which the transmission frame from each transmitter 2 is received. For example, the microcomputer 33 acquires the gear information of the wheel velocity sensors 11*a* to 11*d* provided corresponding to the traveling wheels 5*a* to 5*d*, in addition to the wheel speed information of the traveling wheels 5*a* to 5*d*, from the brake ECU 10 in a predetermined cycle, for example, every 10 milliseconds.

The "gear information" is information indicating a tooth position of a gear rotated together with each of the traveling wheels 5*a* to 5*d*. The "tooth position" means a tooth rotation state indicated by the number of tooth edges (or may be referred to as a "tooth edge number" or an "edge number") of the gear or the number of teeth (or may be referred to as a "tooth number") of the gear, in other words, the rotation angle, and is a value corresponding to the presence angle of each transmitter 2. The wheel velocity sensors 11*a* to 11*d* are configured of, for example, electromagnetic pickup sensors disposed facing the gear teeth, and change detection signals with passage of the gear teeth. The wheel velocity sensors 11*a* to 11*d* of such a type output square pulse waves corresponding to the passage of teeth as detection signals, and hence the rising and falling of the square pulse waves represent the passage of the tooth edges of the gear. For this reason, the brake ECU 10 counts the number of tooth edges of the gear, that is, the number of passage of the edges, from the number of rising and falling of the detection signals of the wheel velocity sensors 11*a* to 11*d*. Then, as the gear information indicating the tooth position, the brake ECU 10 transmits, for example, the number of tooth edges at that time to the microcomputer 33 in each predetermined cycle. As a result, the microcomputer 33 is able to know which tooth of the gear has passed.

The number of tooth edges is reset each time the gear rotates once. For example, when the number of teeth provided on the gear is 48, the number of edges is counted in a total of 96 from 0 to 95, and when the count value reaches 95, the count value is returned to 0, and the number of edges is counted again.

Here, a case will be described where the number of tooth edges of the gear is transmitted from the brake ECU 10 to the microcomputer 33 as the gear information, but the number of teeth which is a count value of the number of passage of the teeth may be used. Also, the number of edges that have passed during a predetermined cycle may be transmitted to the microcomputer 33, the microcomputer 33 may be caused to add the number of edges having passed during the predetermined cycle to the previous number of edges, and count the number of edges in that cycle. Naturally, in this case as well, the number of teeth can be used instead of the number of edges. That is, it is only necessary that the microcomputer 33 can finally acquire the number of edges or the number of teeth in the cycle as the gear information. The brake ECU 10 resets the number of tooth edges or the number of teeth of the gear each time the power is turned off and starts the counting again when the power is turned on or when the vehicle speed becomes a predetermined vehicle speed after the power is turned on. Thus, even when the reset is made each time the power is turned off, the same tooth is represented by the same number of edges or the same number of teeth while the power is turned on.

Then, the microcomputer 33 measures the reception timing when the frame transmitted from each transmitter 2 is received, and detects the wheel position on the basis of the number of gear edges at the frame reception timing from the acquired gear edge numbers. A specific method for detecting the wheel position will be described later in detail, and this makes it possible to identify which of the traveling wheels 5*a* to 5*d* each transmitter 2 is attached to.

When the microcomputer 33 uses the wheel position detection to identify which of the traveling wheels 5*a* to 5*d* each transmitter 2 is attached to and performs the ID registration associating the ID information of each transmitter 2 with the position of each of the traveling wheels 5*a* to 5*d* to which each transmitter 2 is attached. Subsequently, the microcomputer 33 detects the tire's pneumatic pressure at each of the wheels 5*a* to 5*d* based on the ID information and data related to the tire pneumatic pressure stored in the transmission frame from each transmitter 2. Then, the microcomputer 33 outputs an electrical signal corresponding to the tire's pneumatic pressure to the meter 4 through the in-vehicle LAN such as CAN. For example, the microcomputer 33 detects a decrease in tire's pneumatic pressure by comparing the tire's pneumatic pressure with a predetermined threshold Th, and when detecting a decrease in the tire's pneumatic pressure, the microcomputer 33 outputs a signal to that effect to the meter 4. As a result, the meter 4 is notified that the tire's pneumatic pressure of any of the four traveling wheels 5*a* to 5*d* has decreased.

The meter 4 functions as an alarm part, is disposed in a place where the user can visually recognize as shown in FIG. 1, and is configured of a meter display or the like installed in an instrument panel in the vehicle 1, for example. For example, when the microcomputer 33 in the TPMS-ECU 3 transmits a signal indicating a decrease in the tire's pneumatic pressure, the meter 4 displays the information of a decrease in the tire's pneumatic pressure while identifying which one of the wheels 5*a* to 5*d* has a decrease in the tire's pneumatic pressure. As a result, the user is notified of a decrease in the tire's pneumatic pressure.

In the following, with regard to the operation of the TPMS according to the present embodiment, the wheel position detection and the tire pneumatic pressure detection, which are executed by the TPMS, will be described separately. First, a specific method for the wheel position detection will be described with reference to FIGS. 3 to 7.

In the registration mode, at the transmitter 2 side, the microcomputer 23 monitors the detection signal of the acceleration sensor 22 in each predetermined sampling cycle on the basis of the power supply from the battery, thereby detecting the vehicle speed and the presence angle of the transmitter 2 in each of the traveling wheels 5*a* to 5*d*.

The microcomputer 23 executes the frame transmission with the ID information at a timing in which the presence angle of the transmitter 2 reaches the predetermined angle, when the transmission command of the frame transmission arrives. The microcomputer 23 is switched to the registration mode, and executes the initial frame transmission as a transmission timing in which the presence angle of the transmitter reaches the predetermined angle when the transmission command of the initial frame arrives. Subsequently, as the transmission command of the frame transmission arrives from the TPMS-ECU 3, the response frame transmission from the transmitter 2 is executed as the timing in which the presence angle of the transmitter 2 reaches an angle identical to the one at the initial frame transmission as being the first frame transmission. The above describes that the frame transmission is executed based on a condition that the frame transmission command arrives. However, the initial frame transmission may be executed without the arrival of the frame transmission command.

Figure 3:
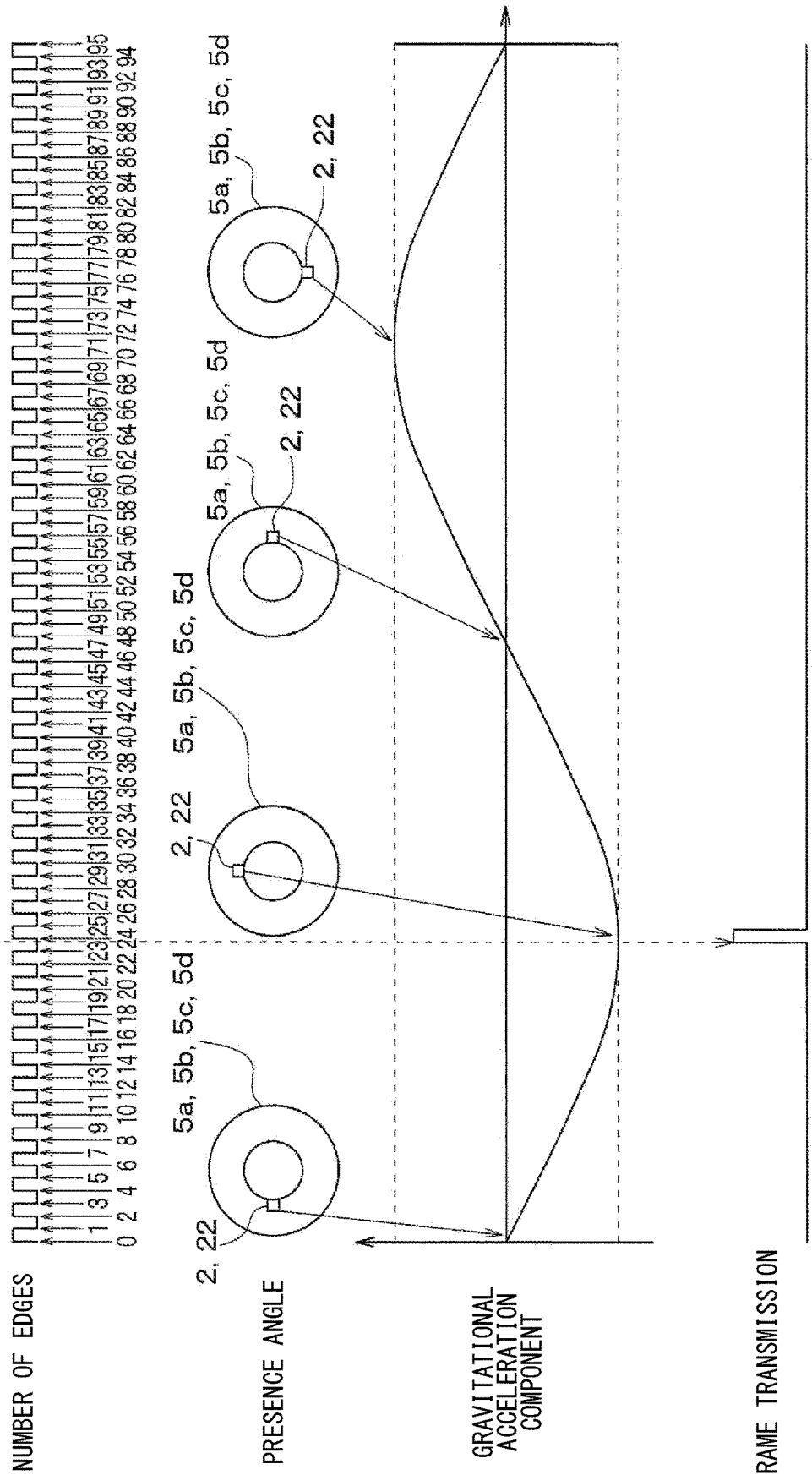
FIG. 3 is a timing chart for explaining identification of a wheel position.

That is, when the gravitational acceleration component of the detection signal of the acceleration sensor 22 is extracted, a sine wave as shown in FIG. 3 is obtained. The presence angle of the transmitter 2 may be obtained based on the sine wave. For this reason, the frame transmission is executed at the timing at which the transmitter 2 has the same presence angle on the basis of the sine wave.

At the TPMS-ECU 3, the microcomputer 33 acquires the gear information of the wheel velocity sensors 11a to 11d provided corresponding to the traveling wheels 5a to 5d from the brake ECU 10 in a predetermined cycle, for example, every 10 milliseconds. Then, the microcomputer 33 measures the reception timing when the frame transmitted from each transmitter 2 is received, and acquires the number of gear edges at the frame reception timing from the acquired number of gear edges.

At this time, the frame reception timing transmitted from each transmitter 2 does not always match with the cycle in which the gear information is acquired from the brake ECU 10. In this case, the number of gear edges indicated by the gear information acquired in the cycle closest to the frame reception timing, that is, the cycle immediately before or immediately after the frame reception timing, among the cycles in which the gear information is acquired from the brake ECU 10 is used as the number of gear edges at the frame reception timing. In addition, the number of gear edges at the frame reception timing may be calculated using the number of gear edges indicated by the gear information acquired in the cycle immediately before or immediately after the frame reception timing among the cycles in which the gear information is acquired from the brake ECU 10. For example, an intermediate value of the number of gear edges indicated by the gear information acquired in the cycle immediately before or immediately after the frame reception timing can be used as the number of gear edges at the frame reception timing.

The operation of acquiring the number of gear edges at the frame reception timing is repeated each time the frame is received, and the wheel position is identified on the basis of the number of gear edges at the received frame reception timing. Specifically, the wheel position is identified by determining whether or not the variation in the number of gear edges at the frame reception timing is within a predetermined range set on the basis of the number of gear edges at the previous reception timing.

Each transmitter 2 executes the frame transmission at a timing in which the presence angle of the transmitter 2 reaches the predetermined angle. The number of gear edges corresponds to the travelling wheels 5a to 5d at a reception timing in which the TPMS-ECU 3 executes the frame reception. For the wheel from which the corresponding transmitter 2 executes the frame transmission, the number of gear edges is substantially same as the number of gear edges at a previous reception timing. For this reason, the variation in the number of gear edges at the frame reception timing is small and falls within a predetermined range. This also applies to a case where frames are received multiple times, and the variation in the number of gear edges at the reception timing of each frame falls within a predetermined range determined at the first frame reception timing. On the other hand, at the wheel different from the transmitter 2 executing the frame transmission, the number of edges at the reception timing whenever the reception is executed varies.

Since the rotation of the gears of the wheel velocity sensors 11a to 11d is associated with the traveling wheels 5a to 5d, for the wheel from which the frame has been transmitted from the corresponding transmitter 2, the tooth position indicated by the number of gear edges at the frame reception timing is almost the same. However, the rotation states of the traveling wheels 5a to 5d varies depending on road conditions, turning, lane change, or the like, and therefore, the rotation states of the traveling wheels 5a to 5d cannot be completely the same. For this reason, for the wheel different from the wheel from which the frame has been received, the tooth position indicated by the number of gear edges at the frame reception timing varies.

Figure 4:
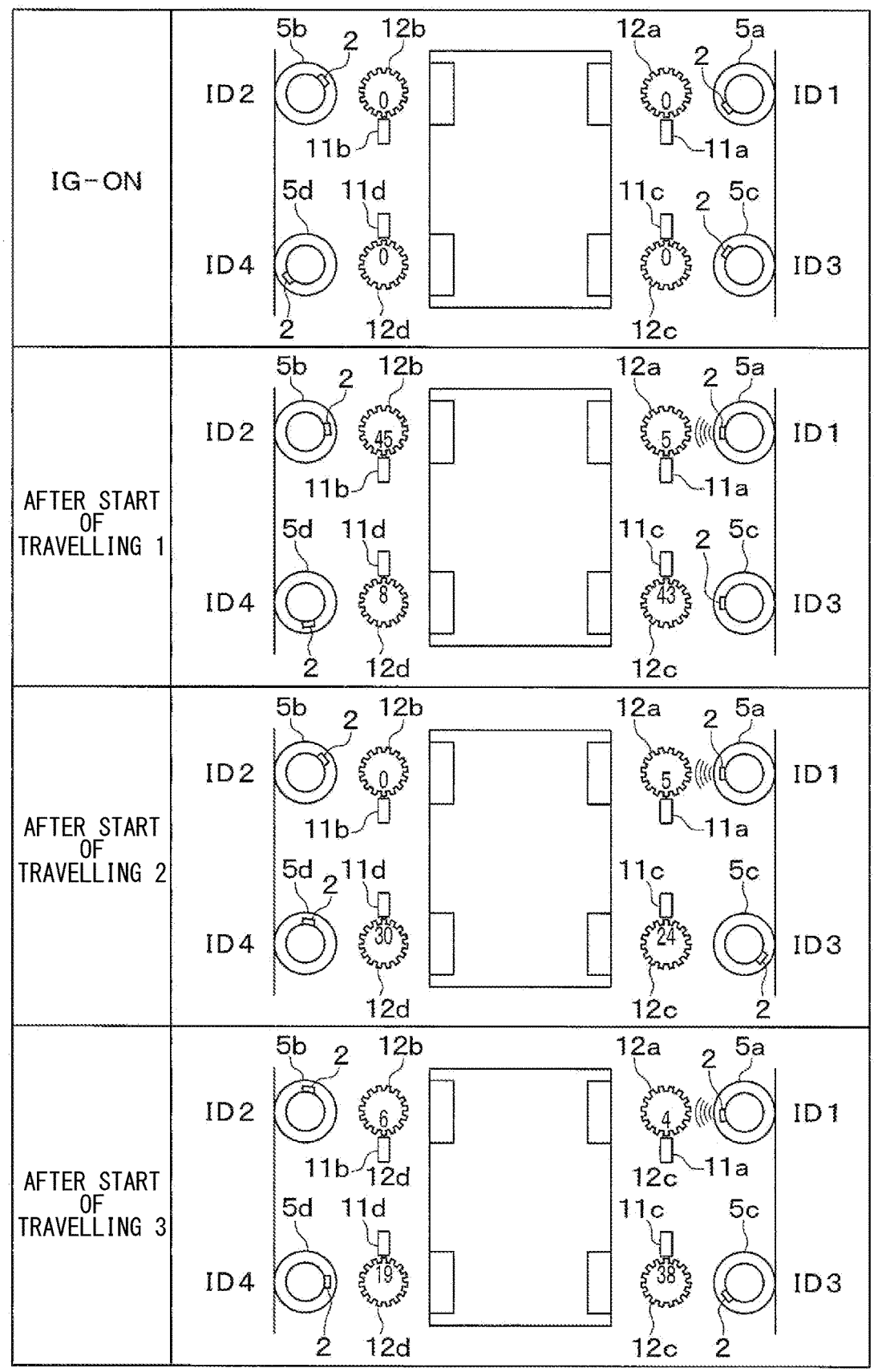
FIG. 4 is an image diagram showing a change in gear information.

Therefore, as shown in FIG. 4, from the state where the number of edges of the gears 12a to 12d is 0 when the start switch is turned on, for the wheel different from the wheel from which the frame has been gradually transmitted from the transmitter 2 after the start of traveling, the number of edges at the frame reception timing varies. As shown in FIG. 5, when the transmitter 2 having transmitted the frame is attached to the right front wheel 5a, the variation in the number of edges of the other wheels becomes large. The wheel position is identified by determining whether or not the variation is within a predetermined range.

Figure 5A:
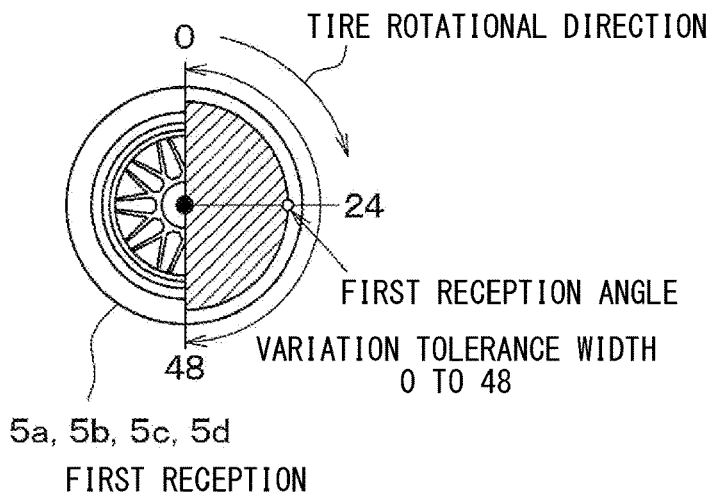
FIG. 5A is a schematic view illustrating an identification logic for the wheel position.
Figure 5B:
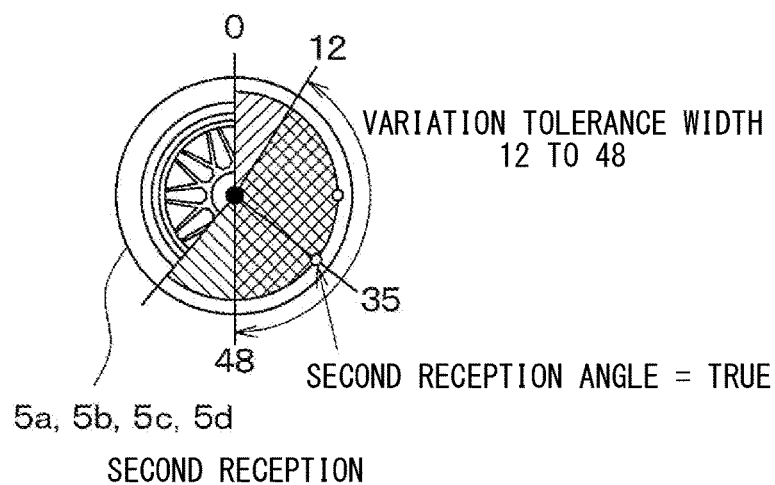
FIG. 5B is a schematic view illustrating an identification logic for the wheel position.
Figure 5C:
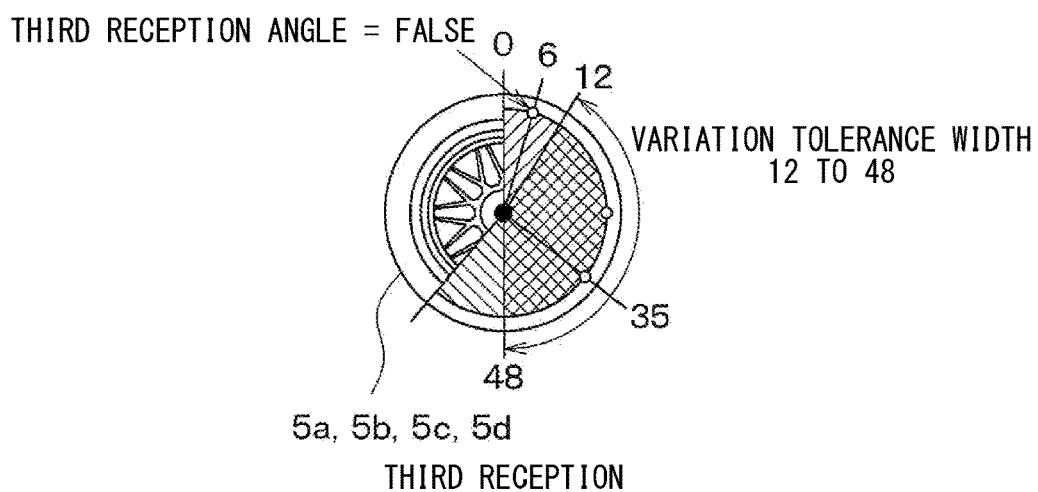
FIG. 5C is a schematic view illustrating an identification logic for the wheel position.

For example, as shown in FIG. 5A, it is assumed that the position of the transmitter 2 at the time of first frame transmission is a first reception angle. Further, it is assumed that the variation tolerance width, which is a tolerance width as the variation in the number of gear edges, is a value corresponding to a range of 180° centered on the first reception angle, that is, a range of ±90° of the first reception angle. In the case of the number of edges, it is assumed that the number of edges is ±24 around the number of edges at the time of the first reception. When the number of teeth is used instead of the number of edges, the number of teeth is within a range of ±12 centered on the number of teeth at the first reception. In this case, as shown in FIG. 6B, when the number of gear edges at the time of second frame reception is within the range of the variation tolerance width determined by the first frame reception, the wheel having the number of edges may match with the wheel on which the frame transmission has been performed, and becomes TRUE.

However, also in this case, the variation tolerance width is determined around a second reception angle that is the angle of the transmitter 2 at the time of the second frame reception and is a value corresponding to 180° centered on the second reception angle. For this reason, a portion where the 180° variation tolerance width centered on the first reception angle that is the previous variation tolerance width and the 180° variation tolerance width centered on the second reception angle becomes a new variation tolerance width, and the new variation tolerance width can be narrowed to the overlapping range. When the number of edges is used, the number of edge range of 12 to 48 is the variation tolerance width.

Therefore, as shown in FIG. 6C, when the number of gear edges at the time of third frame reception is within the range of the variation tolerance width determined by the first and second frame reception, the wheel having the number of edges does not match with the wheel on which the frame transmission has been performed, and becomes FALSE. At this time, even if the number of gear edges is within the range of the variation tolerance width determined by the first frame reception, it is determined as FALSE when being outside the range of the variation tolerance width determined by the first and second frame receptions. In this way, it is possible to identify which of the traveling wheels 5a to 5d the transmitter 2 having transmitted the received frame is attached to.

That is, as shown in FIG. 6A, for a frame including ID1 as ID information, the number of gear edges is acquired at each frame reception timing and stored for each of the corresponding traveling wheels 5a to 5d. Here, the traveling wheels 5a to 5d are respectively represented by a left front wheel FL, a right front wheel FR, a left rear wheel RL, and a right rear wheel RR. Then, each time a frame is received, it is determined whether or not the number of gear edges acquired is within the range of the variation tolerance width, and a wheel out of the range is removed from wheel candidates each attached with the transmitter 2 having transmitted the frame. Then, wheels that are not removed until the end are registered as the wheels each attached with the transmitter 2 to which the frame has been transmitted. In the case of the frame including ID1, the right front wheel FR, the right rear wheel RR, and the left rear wheel RL are removed from the candidates in this order, and the left front wheel FL lastly remained is registered in association with ID information, as the wheel attached with the transmitter 2 to which the frame has been transmitted.

Then, as shown in FIGS. 6B to 6D, the same processing as that for the frame including ID1 is performed for the frames including ID2 to ID4 as ID information. Hence it is possible to identify the wheel attached with the transmitter 2 to which each frame has been transmitted, and it is possible to identify all four wheels to each of which the transmitter 2 is attached.

Although the wheel position detection can be executed by such a method, the frame transmission from the transmitter 2 is typically executed according to the rotation of the traveling wheels 5a to 5d. The frame transmission is executed once per multiple rotations in consideration of the battery life. It is not limited to the execution of frame transmission at a timing suitable for the wheel position detection, that is, a timing in which the variation in the number of gear edges among wheels gets larger. It may take longer to execute the wheel position detection.

In the present embodiment, the TPMS-ECU 3 measures the timing suitable for the wheel position detection from the acquired gear information of each of four travelling wheels 5a to 5d, and transmits the frame transmission command at this timing to each transmitter 2. It is possible to shorten the time of wheel position detection, as the frame transmission from each transmitter 2 is executed at this timing. The following describes a measurement method for timing suitable for wheel position detection (hereinafter referred to as suitable timing).

The suitable timing is a timing in which the variation in the gear information of each of the travelling wheels 5a to 5d, in other words, the variation in the number of gear edges gets larger. The TPMS-ECU 3 sets a threshold range for each of the travelling wheels 5a to 5d based on the predetermined number of gear edges, and the suitable timing is set at a timing in which there is a wheel out of the threshold range. For example, at a timing when the user turns the vehicle 1, the number of gear edges at each of the travelling wheels 5a to 5d tends to vary greatly. In this situation, the timing at which the vehicle 1 is turned is the suitable timing.

Figure 7A:
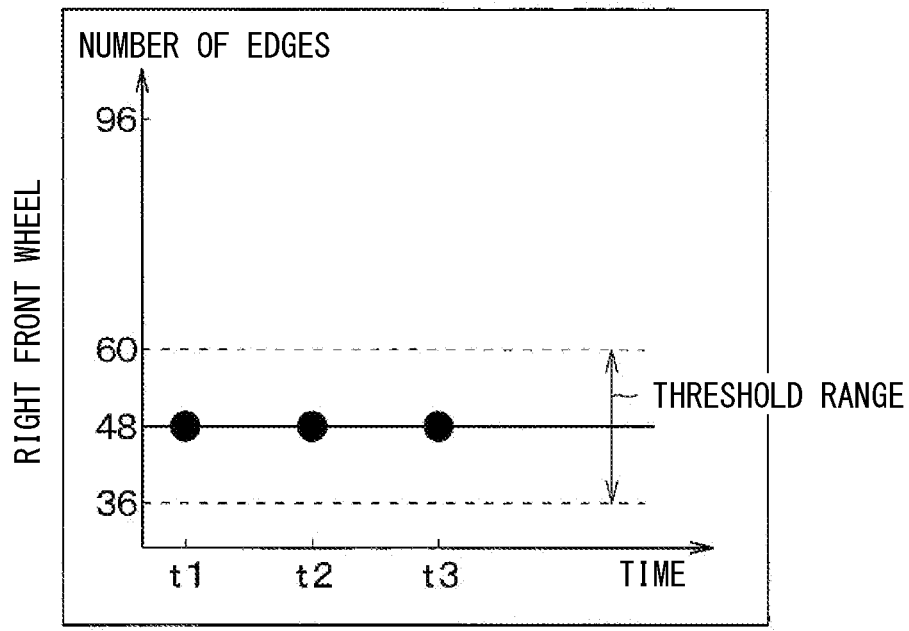
FIG. 7A is a diagram showing a timing in which the number of edges of a right front wheel reaches a reference value.

The right front wheel 5a is taken as an example for explanation. As illustrated in FIG. 7A, in a situation where the reference number of gear edges of the right front wheel 5a is, for example, 48, the number of edges from 36 to 60 is set in the threshold range based on the reference number. The threshold range may be set arbitrarily. Threshold range may be the same as the above-mentioned first variation tolerance width, or may also be a different value. When the number of gear edges of the right front wheel 5a reaches 48, the microcomputer 33 checks the number of gear edges at other wheels, and determines whether or not the number of gear edges is within the threshold range. If the number of gear edges falls outside the threshold range at any one of the wheels, this timing is set as the "suitable timing".

Figure 7B:
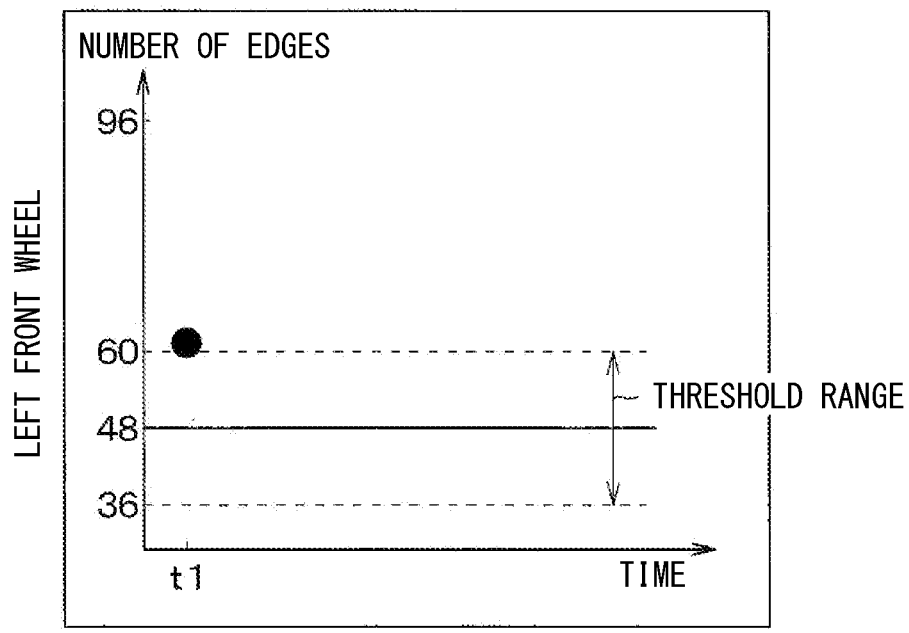
FIG. 7B is a diagram showing the number of edges of the left front wheel at a timing in which the number of edges of the right front wheel reaches a reference value.

In the present example, as illustrated in FIGS. 7A and 7B, in a situation where the number of gear edges of the right front wheel 5a reaches 48 at time t1, when the number of edges of the left front wheel 5b falls out of the threshold range, the frame transmission is output to the transmitter 2 of each of the travelling wheels 5a to 5d as the suitable timing. As a result, the transmitter 2 attached to each of the travelling wheels 5a to 5d executes the response frame transmission at the timing in which the presence angle of the transmitter 2 reaches the predetermined angle. Subsequently, the number of gear edges of the right front wheel 5a at the timing, in which each of the travelling wheels 5a to 5d executes the response frame transmission, is measured, and it is determined whether or not the number of gear edges of each of the travelling wheels 5a to 5d is within the allowable range.

Since the left rear wheel 5b falls out of the threshold range of the number of edges in the right front wheel 5a, it is probable that the number of gear edges at the right front wheel 5a at the timing, in which the transmitter 2 attached to the left front wheel 5b executes the response frame transmission, falls out of the variation tolerance width. Therefore, the ID information of the transmitter 2 attached to the left front wheel 5b is excluded from the candidates, as not being the right front wheel 5a.

Figure 7C:
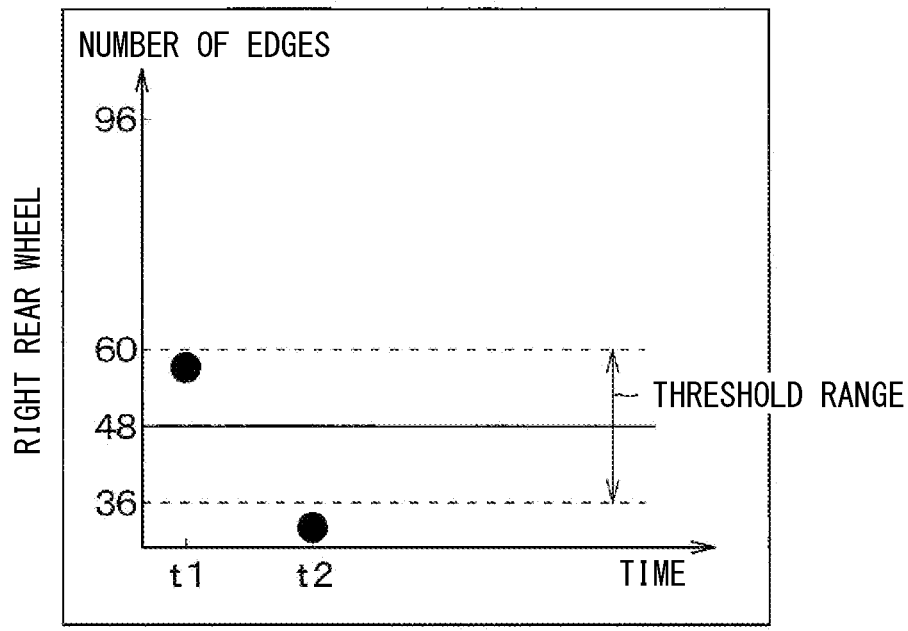
FIG. 7C is a diagram showing the number of edges of a right rear wheel at a timing in which the number of edges of the right front wheel reaches a reference value.
Figure 7D:
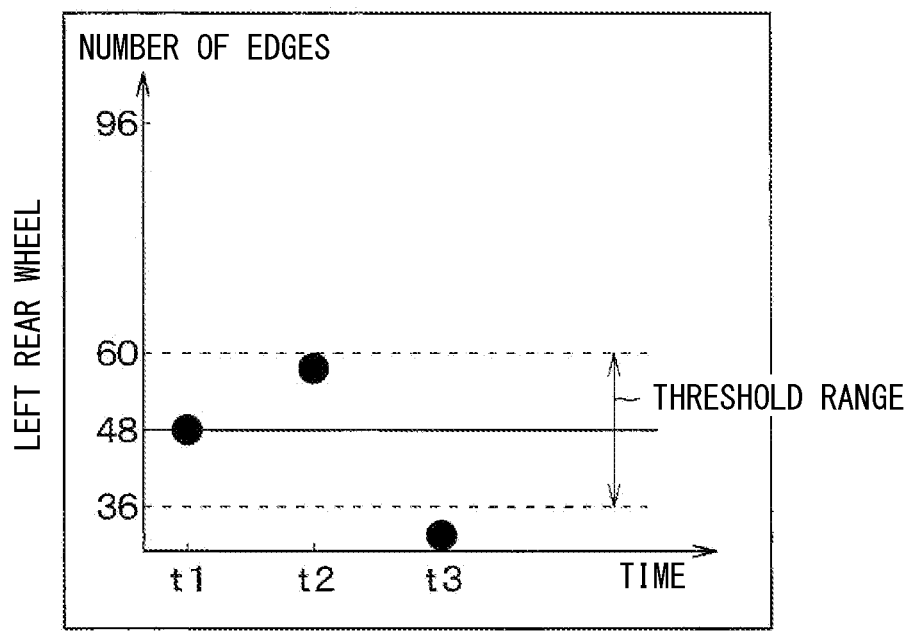
FIG. 7D is a diagram showing the number of edges of a left rear wheel at a timing in which the number of edges of the right front wheel reaches a reference value.

In the present example, as illustrated in FIGS. 7C, 7D, at time t1, the number of edges at the right rear wheel 5c and the number of edges at the left rear wheel 5d are within the threshold range at a time where the number of gear edges at the right front wheel 5a reaches 48. In this situation, with regard to the transmitters 2 attached to the right rear wheel 5c and the left rear wheel 5d, although the number of edges at the right front wheel 5a at the time of the response frame transmission executed by these transmitters 2 may fall outside the variation tolerance width, this section continues the explanation as if the number of edges is within the variation tolerance width.

As illustrated in FIGS. 7A and 7C, in a situation where the number of gear edges of the right front wheel 5a reaches 48 at time t2, when the number of edges of the right rear wheel 5c falls out of the threshold range, the frame transmission command is output to the transmitter 2 of each of the travelling wheels 5a to 5d as the suitable timing. As a result, the identical operation as described above is executed. Therefore, the ID information of the transmitter 2 attached to the right rear wheel 5c is excluded from the candidates, as not being the right front wheel 5a.

As illustrated in FIGS. 7A and 7D, in a situation where the number of gear edges of the right front wheel 5a reaches 48 at time t3, when the number of edges of the left rear wheel 5d falls out of the threshold range, the frame transmission command is output to the transmitter 2 of each of the travelling wheels 5a to 5d as the suitable timing. As similar to the above description, the ID information of the transmitter 2 attached to the left rear wheel 5d is excluded from the candidates, as not being the right front wheel 5a. The last remaining ID information of the transmitter 2 attached to the right front wheel 5a is registered as the ID information of the right front wheel 5a.

The wheel position detection is executed for each of the travelling wheels 5a to 5d. Since the ID information of the transmitter 2 attached to each of the travelling wheels 5a to 5d is identified in order, the ID information of each transmitter 2 is stored in association with the position of the wheels to which the transmitters 2 are respectively attached. The TPMS-ECU 3 detects a suitable timing, and each transmitter 2 executes the response frame transmission at the suitable timing. Therefore, the wheel position detection may be completed in a shorter time.

The wheel position detection is executed for each of the travelling wheels 5a to 5d in the identical manner. However, the wheel position detection for some wheels may be completed earlier. In this situation, with regard to the wheels for which the wheel position detection has not been completed, the information of the wheels for which the wheel position detection has been completed is reflected, and the ID information of the transmitter attached to the wheel at which the wheel position detection has been completed is excluded from the candidates. Therefore, it is possible to complete the wheel position detection in a shorter time.

Figure 8:
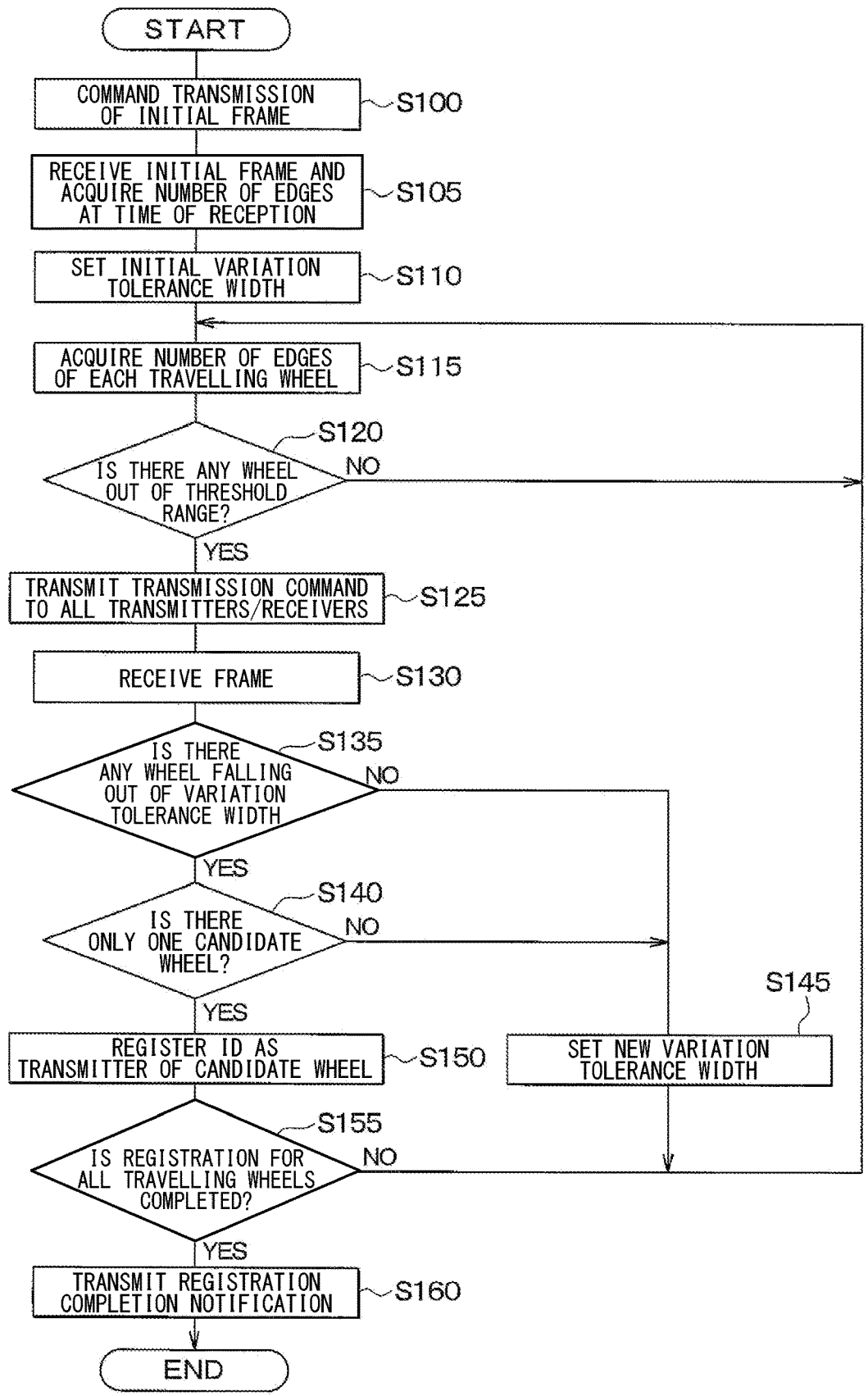
FIG. 8 is a flowchart showing details of wheel position detection.
Figure 9:
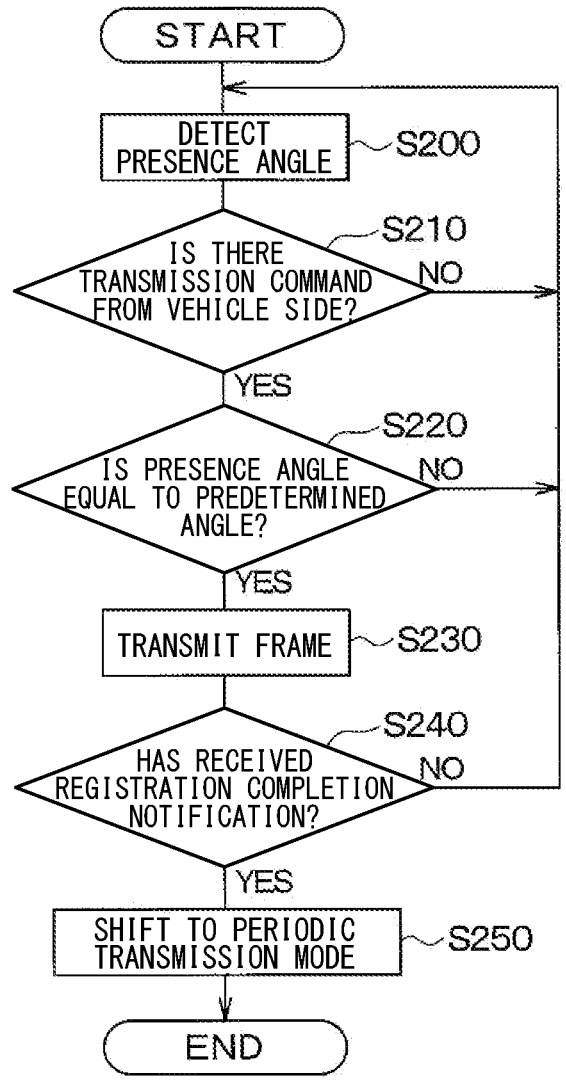
FIG. 9 is a flowchart showing details of response transmission processing.

In particular, the TPMS-ECU 3 and the transmitter 2 execute the wheel position detection by executing the respective processes illustrated in FIGS. 8 and 9. FIG. 8 is a flowchart that illustrates details of the wheel position detection executed by the microcomputer 33 in the TPMS-ECU 3. The process is executed every predetermined control cycle when the microcomputer 33 is switched into the registration mode. FIG. 9 is a flowchart showing details of the response transmission process executed by the microcomputer 23 in each transmitter 2. The response frame transmission is executed at each predetermined control cycle when the start of vehicle travelling is detected. The following describes each process in a chronological order.

The microcomputer 33 transmits a command for instructing the initial frame transmission to each transmitter 2 as illustrated in S100 of FIG. 8, when a start switch (not shown) is pressed down or when the microcomputer 33 is switched to the registration mode in response to the start of vehicle travelling. In a situation where the wheel position detection is executed in response to a user operating an operation switch, the microcomputer 33 transmits a registration mode signal to each transmitter 2 as the microcomputer 33 is switched to the registration mode in response to detecting the operation of the operation switch after the start switch is pressed down. At the same time or later, the transmission command for instructing the initial frame transmission is output. Subsequently, the microcomputer 33 waits for the arrival of an initial frame from each transmitter 2.

On the other hand, each transmitter 2 executes a process illustrated in FIG. 9 in response to switching to the registration mode. Each transmitter 2 is switched to the registration mode, in response to detecting the start of vehicle travelling from the detected signal of the acceleration sensor 22 or the arrival of the registration mode signal from the TPMS-ECU 3.

In S200, the microcomputer 23 detects the presence angle of the transmitter 2 provided in the microcomputer 23. In S210, it is determined whether or not there is a frame transmission command from the TPMS-ECU 3. In a situation where the transmission command is output in S100, an affirmative determination is made and the process proceeds to S220. The microcomputer 23 determines whether or not the presence angle of the subject transmitter 2 has reached the predetermined angle. In a situation where the affirmative determination is made in S220, the process proceeds to S230 and then the initial frame transmission is executed. In a situation where the transmission command has not been output, the microcomputer 22 waits for the arrival of the transmission command, and the processing at S220, S230 is executed after the transmission command arrives.

The process proceeds to S240, and it is determined whether or not the registration completion notification is received. The ID registration for all of the travelling wheels 5a to 5d has not completed at this stage, and the registration completion notification has not arrived from the TPMS-ECU 3. Therefore, a negative determination is made, and the processing from S200 is repeated.

The initial frame transmission is executed since the arrival of the transmission command. However, it is not limited to this situation. In a situation where the microcomputer 23 is switched to the registration mode, the initial frame transmission may be automatically executed in response to, for example, the vehicle speed reaching the predetermined speed without the arrival of the transmission command.

In the TPMS-ECU 3, the microcomputer 33 outputs the transmission command, and then waits for the initial frame transmission from each transmitter 2. Subsequently, processing of step S105 is executed. The processing of S105, S110, and S130 to S145 is executed in the same manner for the travelling wheels 5a to 5d. However, the processing is shown herein as an integrated flowchart.

In S105, the initial frame sent from each transmitter is received. In a situation where the initial frame is received, the number of edges, which indicates gear information of each of the wheel acceleration sensors 11a to 11d at a reception timing, is acquired. Subsequently, the process proceeds to S110 for setting the initial variation tolerance width, in other words, the variation tolerance width at the first reception timing. These processes are executed each time the initial frame arrives from each transmitter 2. The variation tolerance width as shown in FIG. 5 is set for each of four wheels with respect to each ID of the transmitter 2 that has sent the initial frame as shown in FIG. 6.

The process proceeds to S115. For detecting the suitable timing, the number of gear edges of each of the travelling wheels 5a to 5d is subsequently acquired from the gear information of each of the wheel velocity sensors 11a to 11d obtained from the brake ECU 10. In S120, the number of edges of each of the traveling wheels 5a to 5d is compared to determine whether or not any wheel is outside the threshold range. In particular, for each of the travelling wheels 5a to 5d, when the acquired number of edges reaches the reference number of edges, it is determined whether or not the number of edges of other travelling wheels 5a to 5d falls out of the threshold range. In the following, one of the travelling wheels 5a to 5d reaching the reference number of edges is referred to as a reference wheel, and other of the travelling wheels 5a to 5d are referred to other wheels. It is possible to determine the suitable timing by determining that the number of edges of the other wheels is out of the threshold range of the reference wheel.

In a situation where the number of edges of other wheels does not fall out of the threshold range of the reference wheel, the respective processes at S115 and S120 are repeated. In a situation where the number of edges falls out of the threshold range of the reference wheel, since it is the suitable timing, the process proceeds to S125 and the frame transmission command is output to all of the transmitters 2. The frame transmission command is transmitted to each transmitter 2 through the transmission/reception circuit 32 and the antenna 31.

On the other hand, in a situation where the TPMS-ECU 3 outputs the frame transmission command as the process in S125, the affirmative determination is made at S210 in FIG. 9. Therefore, the process proceeds to S220 and each transmitter 2 executes the frame transmission. As a result, each transmitter 2 transmits a frame when its own presence angle reaches the predetermined angle.

In the TPMS-ECU 3, processing of frame transmission is executed at S130 in FIG. 8. When the TPMS-ECU 3 receives the frame from each transmitter 2, the number of gear edges of each of the travelling wheels 5a to 5d at the reception timing is acquired. In S135, it is determined whether or not there is any wheel whose number of edges at the reception timing of the frame transmitted from each transmitter 2 falls out of the variation tolerance width. Based on the determination, the wheel falling out of the variable allowable range is excluded from the candidate wheels each attached with the transmitter 2 having transmitted the frame.

In a situation where the affirmative determination is made, the process proceeds to S140. In S140, it is determined whether or not there is only one wheel in the candidate wheel. In other words, in S140, it is determined whether or not there is only one remaining wheel which has not been excluded from the candidate wheel. In a situation where there is only one candidate wheel, the process proceeds to S145, and a new variation tolerance width is set. In other words, the overlapping range between the variation tolerance width at the timing of receiving the present frame and the variation tolerance width which had been set until the reception of the previous frame, for example the initial variation tolerance width set last time at the time of the second reception. The overlapping range becomes a new variation tolerance width. The process returns to S115, and each processing is repeated. Even though the negative determination is made in S135, the processing of S145 is executed in the same manner, and then each of the above processes is repeated.

In S140, in a situation where there is only one candidate wheel and then the affirmative determination is made, the process proceeds to S150. The ID information of the transmitter 2, which has transmitted the frame, is registered as the ID information of the transmitter 2 attached to the remaining wheel as a candidate wheel in association with the wheel.

The process proceeds to S155, and it is determined whether or not the registration ID of all of the travelling wheels 5a to 5d is completed. In a situation where the negative determination is made, the process returns to S115. For the transmitter 2 which has not been registered, the processing from S115 is repeated. In a situation where the registration of ID information for all of the travelling wheels 5a to 5d is finally completed, the affirmative determination is made in S155, and the process proceeds to S160. In S160, the registration completion notification as a command indicating the completion of the registration mode is output to each transmitter 2. The TPMS-ECU 3 terminates the registration mode and switches the mode to the tire pneumatic pressure detection mode, and detects the tire pneumatic pressure for each of the travelling wheels 5a to 5d based on the frame storing information related to the tire's pneumatic pressure sent from each transmitter 2.

Each transmitter 2 completes the frame transmission at S230, and then proceeds to S240 to determine whether or not the registration completion notification has been received. In a situation where the registration completion notification is transmitted in S160, since the affirmative determination is made in S240, the process proceeds to S250 and the registration mode is completed and switched to the periodic transmission mode. As a result, the frame transmission for detecting the tire's pneumatic pressure is executed as the periodic transmission mode subsequently.

In a situation where the wheel position detection is executed, the tire pneumatic pressure detection is executed subsequently. In particular, in a situation where the tire pneumatic pressure detection is executed, the frame is transmitted at regular intervals from each transmitter 2 in the periodic transmission mode. When the frames are transmitted from the respective transmitters, 2, the TPMS-ECU 3 receives the frames corresponding to four wheels. The TPMS-ECU 3 identifies which of the transmitters 2 respectively attached to the wheels 5a to 5d has sent the frame based on the ID information stored in each frame, and detects the tire's pneumatic pressure of each of the wheels 5a to 5d based on the information related to the tire's pneumatic pressure. Therefore, it is possible to detect a decrease in the tire's pneumatic pressure of each of the wheels 5a to 5d, and identify which of the wheels 5a to 5d has a decrease in the tire's pneumatic pressure. When a decrease in tire's pneumatic pressure is detected, the decrease is notified to the meter 4 so that the meter 4 specifies the wheels 5a to 5d and displays the information of the decrease in the tire's pneumatic pressure, and notifies a driver of the decrease in the tire's pneumatic pressure of the identified wheel.

As described above, in the present embodiment, the suitable timing for executing the frame transmission for detecting wheel position is detected, and outputs the transmission command for instructing the frame transmission to each transmitter 2 through the TPMS-ECU 3 at the suitable timing. The TPMS-ECU 3 receives the response frame transmitted from the transmitter 2 in response to the transmission command, and executes the wheel position detection based on the gear information of each of the travelling wheels 5a to 5d at the reception timing. Therefore, it is positive to provide a wheel position detection apparatus for detecting the wheel position in a shorter time.

Second Embodiment

Since the present embodiment is similar to the first embodiment except that the method of wheel position detection is changed as compared with the first embodiment, only parts different from the first embodiment will be described.

In the first embodiment, the suitable timing is detected. In a situation where the transmission command for instructing the frame transmission is output to each transmitter 2 from the TPMS-ECU 3, each transmitter 2 executes the response frame transmission in response to the transmitter's own presence angle reaching the predetermined angle. On the other hand, it is also possible to store the information of the own presence angle in the frame transmitted from each transmitter 2 for executing the wheel position detection based on the information of the presence angle.

In particular, the TPMS-ECU 3 outputs the transmission command for instructing the frame transmission to each transmitter 2 at the timing in which the number of edges of each of the travelling wheels 5*a* to 5*d* reaches the reference value, as the initial frame transmission. Each transmitter 2 is controlled to transmit the response frame storing the information of presence angle at a timing of receiving the transmission command. In a situation where the suitable timing is detected, the transmission command is output to each transmitter 2 for instructing the transmitter 2 to execute the frame transmission, at a timing in which the number of edges of each of the travelling wheels 5*a* to 5*d* reaches the reference value. Each transmitter 2 is controlled to transmit the response frame storing the information of presence angle at a timing of receiving the transmission command.

Even in such a situation, in each of the travelling wheels 5*a* to 5*d*, the variation tolerance width is set with the presence angle stored in the initial frame as the first reception angle, and then the travelling wheel is excluded from the candidate wheels in a case where the presence angle stored in the received response frame falls out of the variation tolerance width. For example, the right front wheel 5*a* is described as an example. In a situation where the number of edges of the right front wheel 5*a* reaches the reference value, for example, 48, the command of the initial frame transmission is output. In a situation where the presence angle stored in the initial frame transmitted in response to the command is 90°, a range of, for example, ±90° is set as the variation tolerance width around 90°. When the number of edges of the right front wheel 5*a* reaches 48 as the reference value, it is determined whether or not the number of edges of other travelling wheels 5*b* to 5*d* falls out of the threshold range, and the situation of having a wheel with the number of edges falling out of the threshold range is detected as the suitable timing. In a situation where the suitable timing is detected, the transmission command is output at a timing in which the number of edges of the right front wheel 5*a* reaches 48 as the reference value. Since the response frame is transmitted from each transmitter 2, it is determined whether or not the presence angle stored in each response frame is included in the variation tolerance width. The ID information of the transmitter 2 whose edge number falls out the variation tolerance width is excluded from the candidates for the right front wheel 5*a*, and the ID information of the last remaining transmitter 2 is registered as the ID information of the right front wheel 5*a*.

Even in such a situation, it is possible to provide the wheel position detection apparatus that executes the wheel position detection in a shorter time by executing the response frame transmission at the suitable time.

Other Embodiments

While the present disclosure has been described in accordance with the embodiment described above, the present disclosure is not limited to the embodiment and includes various modifications and equivalent modifications. In addition, various combinations and forms, and further, other combinations and forms including only one element, or more or less than these elements are also within the scope and the scope of the present disclosure.

In the above embodiment, as the angle at which the frame transmission is executed, the position at an angle of 0° is taken as the position of the acceleration sensor 22 when located at the upper position around the central axis of each of the traveling wheels 5*a* to 5*d*. However, this is merely an example, and any position in the circumferential direction of the wheel may be set to an angle of 0°.

In the above embodiment, the variation tolerance width is modified at the frame reception timing, and the variation tolerance width is narrowed gradually. However, the variation tolerance width set around the tooth position is constant. The variation tolerance width set around the tooth position may be modified. For example, the variation in the tooth position may become larger as the vehicle speed is faster. Therefore, it is possible to set a more accurate allowable variation range by enlarging the variation tolerance width as the vehicle speed becomes faster. As the sampling period for executing the acceleration detection at the acceleration sensor 22 is longer, the detection accuracy at the timing of the angle of the transmitter 2 reaching the predetermined angle decreases. It is possible to set an accurate variation tolerance width by modifying the variation tolerance width in response to this situation. In this situation, since the transmitter 2 grasps, for example, the sampling period, it is possible to include data that determines the magnitude of the variation tolerance width in the frame transmitted by the transmitter 2.

In the above embodiment, the TPMS-ECU 3 acquires the gear information from the brake ECU 10. However, the TPMS-ECU 3 may acquire the number of edges or the number of teeth of the gear as the gear information. Therefore, the TPMS-ECU 3 may obtain the gear information from other ECUs, receive the detected signals of the respective wheel velocity sensor 11*a* to 11*d*, and acquire the number of tooth edges or the number of tooth of the gear from the detected signals. In particular, in the above embodiment, the case where the TPMS-ECU 3 and the brake ECU 10 are configured as separate ECUs has been described, but the TPMS-ECU 3 and the brake ECU 10 may be configured as a single ECU integrated with each other. In that case, the ECU directly inputs the detection signals of the wheel velocity sensors 11*a* to 11*d* and acquires the number of tooth edges or the number of teeth of the gear from the detection signals. In that case, since the number of tooth edges or the number of teeth of the gear can be constantly acquired, unlike the case where these pieces of information are acquired in each predetermined cycle, the wheel position can be detected on the basis of the gear information exactly at the frame reception timing.

In the above embodiment, the detection for the suitable timing is executed by comparing the gear information of each of the travelling wheels 5*a* to 5*d* to the threshold range. However, the detection is executed based on the difference in the gear information, in other words, the difference in the number of edges or the number of teeth. In a situation where the absolute value of the difference in the number of edges or the number of teeth of the respective travelling wheels 5*a* to 5*d* exceeds a threshold value, the absolute value falls out of the threshold range. Therefore, the absolute value of the difference in the number of edges or the absolute value of the difference in the number of teeth may be compared with the threshold value. In this situation, even though a reference is not set for the number of edges or the number of teeth, the absolute value of the difference in the number of edges or the difference in the number of teeth detected every moment may be compared with the threshold value each time.

In the above embodiment, the wheel position detection apparatus provided in the vehicle 1 equipped with four traveling wheels 5*a* to 5*d* has been described. However, the present disclosure can also be applied to a vehicle having a large number of traveling wheels.

In the present disclosure, the wheel velocity sensors 11a to 11d may detect the passage of the gear teeth that are rotated in conjunction with the rotation of the travelling wheels 5a to 5d. Therefore, the gear may have a structure having different magnetic resistances in which the tooth portion whose outer peripheral surface is a conductor and the portion between the teeth are alternately repeated. That is, not only a general one composed of a convex portion in which the outer peripheral surface becomes a conductor and a space in which the outer peripheral surface becomes a non-conductor by making the outer edge portion uneven or rough, but also a portion in which the outer peripheral surface becomes a conductor and a non-conductor, for example. A rotor switch and the like made of an insulator may also be included.

The control unit and the method thereof described in the present disclosure are realized by a dedicated computer provided by configuring a processor and a memory programmed to execute one or more functions embodied by a computer program. Alternatively, the control unit and the method described in the present disclosure may be realized by a dedicated computer provided by configuring a processor with one or more dedicated hardware logic circuits. Alternatively, the control unit and the method thereof described in the present disclosure are based on a combination of a processor and a memory programmed to execute one or more functions and a processor configured by one or more hardware logic circuits. It may be realized by one or more configured dedicated computers. The computer programs may be stored, as instructions to be executed by a computer, in a tangible non-transitory computer-readable medium.

What is claimed is:

1. A wheel position detection apparatus to be applied to a vehicle including a vehicle body attached with a plurality of travelling wheels, each of the travelling wheels having a tire, the wheel position detection apparatus comprising:
    a plurality of transmitters each of which is configured to be attached to a corresponding traveling wheel in the travelling wheels; and
    a receiver configured to be disposed at the vehicle body, wherein each of the transmitters includes:
        an acceleration sensor configured to output a detection signal according to an acceleration including a gravitational acceleration component being varied by a rotation of the corresponding travelling wheel attached with the each of the transmitters; and
        a first controller configured to create a frame including unique identification information, and transmit the frame in response to the receiver outputting a transmission command,
    wherein the receiver includes a second controller configured to execute a wheel position detection, in response to receiving the frame transmitted from the each of the transmitters, through:
        identifying, from each set of the unique identification information included in the frame, the corresponding travelling wheel attached with the each of the transmitters having transmitted the frame; and
        registering the travelling wheels in association with the unique identification information of the each of the transmitters attached to the corresponding travelling wheel in the travelling wheels,
    wherein the second controller is further configured to:
        acquire an edge number of a gear or a tooth number of the gear based on a detection signal of a wheel velocity sensor for detecting a passage of teeth of the gear rotating in coordination with the corresponding travelling wheel, the gear having a circumferential surface with tooth portions and a portion between the tooth portions to alternatively exhibit different magnetoresistance values, the tooth portions being conductors;
        detect suitable timing based on difference in the edge number among the travelling wheels or difference in the tooth number among the travelling wheels; and
        output the transmission command to the each of the transmitters attached to the corresponding travelling wheel, in response to detecting the suitable timing,
    wherein, in a situation where an arbitrary circumferential position of the corresponding travelling wheel centered with respect to a central axis of the corresponding travelling wheel attached with the each of the transmitters having the first controller forms an angle of zero degrees, the first controller is configured to:
        detect a presence angle being an angle where the each of the transmitters is present with respect to the arbitrary circumferential position, based on the gravitational acceleration component included in the detection signal of the acceleration sensor; and
        transmit the frame at a timing in which the presence angle reaches a predetermined angle, in response to the second controller outputting the transmission command, and
    wherein the second controller is further configured to:
        set a variation tolerance width based on the edge number or the tooth number at a timing of receiving the frame;
        remove at least one of the travelling wheels from candidate wheels respectively attached with the transmitters having transmitted the frame, in a condition that the edge number corresponding to the at least one of the travelling wheels or the tooth number corresponding to the at least one of the travelling wheels is outside of a range of the variation tolerance width at the timing of receiving the frame subsequent to setting the variation tolerance width; and
        register remainder of the candidate wheels as the corresponding travelling wheel attached with the each of the transmitters having transmitted the frame.

2. The wheel position detection apparatus according to claim 1,
    wherein the second controller is further configured to detect the suitable timing in response to that an absolute value of the difference in the edge number among the travelling wheels or an absolute value of the difference in the tooth number among the travelling wheels exceeds a predetermined threshold value.

3. The wheel position detection apparatus according to claim 1,
    wherein the second controller is further configured to:
        set a reference value for the edge number or the tooth number corresponding to the each of the traveling wheels; and
        detect the suitable timing at a timing in which one of the travelling wheels has the edge number or the tooth number reaching the reference value and another of the travelling wheels has the edge number or the tooth number being outside of a predetermined threshold range.

4. The wheel position detection apparatus according to claim 1,
wherein the first controller is further configured to:
detect start of travelling of the vehicle based on the detection signal of the acceleration sensor; and
transmit an initial frame at a timing in which the presence angle automatically reaches the predetermined angle, in response to detecting the start of travelling of the vehicle, and
wherein the second controller is further configured to set the variation tolerance width based on the edge number or the tooth number at the timing of receiving the initial frame, in response to receiving the initial frame.

5. The wheel position detection apparatus according to claim 1,
wherein the second controller is further configured to output a transmission command to instruct the each of the transmitters to transmit an initial frame,
wherein the first controller is further configured to execute transmission of the initial frame as transmission of the frame at a timing in which the presence angle reaches the predetermined angle, in response to receiving the transmission command to instruct the transmission of the initial frame, and
wherein the second controller is further configured to set the variance tolerance width based on the edge number or the tooth number at a timing of receiving the initial frame, in response to receiving the initial frame.

6. A wheel position detection apparatus to be applied to a vehicle including a vehicle body attached with a plurality of travelling wheels, each of the travelling wheels having a tire, the wheel position detection apparatus comprising:
a plurality of transmitters each of which is configured to be attached to a corresponding traveling wheel in the travelling wheels; and
a receiver configured to be disposed at the vehicle body, wherein each of the transmitters includes:
an acceleration sensor configured to output a detection signal according to an acceleration including a gravitational acceleration component being varied by a rotation of the corresponding travelling wheel attached with the each of the transmitters; and
a first controller configured to create a frame including unique identification information, and transmit the frame in response to the receiver outputting a transmission command,
wherein the receiver includes a second controller configured to execute a wheel position detection, in response to receiving the frame transmitted from the each of the transmitters, through:
identifying, from each set of the unique identification information included in the frame, the corresponding travelling wheel attached with the each of the transmitters having transmitted the frame; and
registering the travelling wheels in association with the unique identification information of the each of the transmitters attached to the corresponding travelling wheel in the travelling wheels,
wherein the second controller is further configured to:
acquire an edge number of a gear or a tooth number of the gear based on a detection signal of a wheel velocity sensor for detecting a passage of teeth of the gear rotating in coordination with the corresponding travelling wheel, the gear having a circumferential surface with tooth portions and a portion between the tooth portions to alternatively exhibit different magnetoresistance values, the tooth portions being conductors;
detect suitable timing based on difference in the edge number among the travelling wheels or difference in the tooth number among the travelling wheels;
set a reference value for the edge number or the tooth number with respect to each of the travelling wheels; and
output the transmission command to the each of the transmitters attached to the corresponding wheel, at a timing in which the edge number or the tooth number reaches the reference value,
wherein, in a situation where an arbitrary circumferential position of the corresponding travelling wheel centered with respect to a central axis of the corresponding travelling wheel attached with the each of the transmitters having the first controller forms an angle of zero degrees, the first controller is configured to:
detect a presence angle being an angle where the each of the transmitters is present with respect to the arbitrary circumferential position, based on the gravitational acceleration component included in the detection signal of the acceleration sensor; and
transmit the frame including information of the presence angle at a timing of receiving the transmission command, and
wherein the second controller is further configured to:
set a variation tolerance width based on the edge number or the tooth number at a timing of receiving the frame;
remove at least one of the travelling wheels from candidate wheels respectively attached with the transmitters having transmitted the frame, in a condition that the edge number corresponding to the at least one of the travelling wheels or the tooth number corresponding to the at least one of the travelling wheels is outside of a range of the variation tolerance width at the timing of receiving the frame subsequent to setting the variation tolerance width; and
register remainder of the candidate wheels as the corresponding travelling wheel attached with the each of the transmitters having transmitted the frame.

7. A tire pneumatic pressure monitoring system comprising:
a wheel position detection apparatus to be applied to a vehicle including a vehicle body attached with a plurality of travelling wheels, each of the travelling wheels having a tire,
wherein the wheel position detection apparatus includes:
a plurality of transmitters each of which is configured to be attached to a corresponding traveling wheel in the travelling wheels; and
a receiver configured to be disposed at the vehicle body, wherein each of the transmitters includes:
an acceleration sensor configured to output a detection signal according to an acceleration including a gravitational acceleration component being varied by a rotation of the corresponding travelling wheel attached with the each of the transmitters; and
a first controller configured to create a frame including unique identification information, and transmit the frame in response to the receiver outputting a transmission command, wherein the receiver includes a second controller configured to execute a wheel position detection, in response to receiving the frame transmitted from the each of the transmitters, through:
- identifying, from each set of the unique identification information included in the frame, the corresponding travelling wheel attached with the each of the transmitters having transmitted the frame; and
- registering the travelling wheels in association with the unique identification information of the each of the transmitters attached to the corresponding travelling wheel in the travelling wheels, wherein the second controller is further configured to:
- acquire an edge number of a gear or a tooth number of the gear based on a detection signal of a wheel velocity sensor for detecting a passage of teeth of the gear rotating in coordination with the corresponding travelling wheel, the gear having a circumferential surface with tooth portions and a portion between the tooth portions to alternatively exhibit different magnetoresistance values, the tooth portions being conductors;
- detect suitable timing based on difference in the edge number among the travelling wheels or difference in the tooth number among the travelling wheels; and
- output the transmission command to the each of the transmitters attached to the corresponding travelling wheel, in response to detecting the suitable timing, wherein, in a situation where an arbitrary circumferential position of the corresponding travelling wheel centered with respect to a central axis of the corresponding travelling wheel attached with the each of the transmitters having the first controller forms an angle of zero degrees, the first controller is configured to:
- detect a presence angle being an angle where the each of the transmitters is present with respect to the arbitrary circumferential position, based on the gravitational acceleration component included in the detection signal of the acceleration sensor; and
- transmit the frame at a timing in which the presence angle reaches a predetermined angle, in response to the second controller outputting the transmission command, wherein the second controller is further configured to:
- set a variation tolerance width based on the edge number or the tooth number at a timing of receiving the frame;
- remove at least one of the travelling wheels from candidate wheels respectively attached with the transmitters having transmitted the frame, in a condition that the edge number corresponding to the at least one of the travelling wheels or the tooth number corresponding to the at least one of the travelling wheels is outside of a range of the variation tolerance width at the timing of receiving the frame subsequent to setting the variation tolerance width; and
- register remainder of the candidate wheels as the corresponding travelling wheel attached with the each of the transmitters having transmitted the frame, wherein the each of the transmitters includes a sensing part to output a detection signal according to a pneumatic pressure of the tire included in the each of the travelling wheels, and is configured to store information related to the pneumatic pressure of the tire acquired by executing signal processing on the detection signal of the sensing part, and then transmit the frame to the receiver, and wherein the receiver detects the pneumatic pressure of the tire included in the each of the travelling wheels, based on the information related to the pneumatic pressure of the tire.

* * * * *